United States Patent
Hashimoto et al.

(10) Patent No.: US 12,249,338 B2
(45) Date of Patent: Mar. 11, 2025

(54) INFORMATION PROCESSING DEVICE AND DIGITAL ASSISTANT SYSTEM

(71) Applicant: Maxell, Ltd., Kyoto (JP)

(72) Inventors: Yasunobu Hashimoto, Kyoto (JP); Sadao Tsuruga, Kyoto (JP)

(73) Assignee: MAXELL, LTD., Kyota (JP)

(*) Notice: Subject to any disclaimer, the term of this patent is extended or adjusted under 35 U.S.C. 154(b) by 0 days.

(21) Appl. No.: 17/604,507

(22) PCT Filed: Apr. 18, 2019

(86) PCT No.: PCT/JP2019/016597
§ 371 (c)(1),
(2) Date: Oct. 18, 2021

(87) PCT Pub. No.: WO2020/213116
PCT Pub. Date: Oct. 22, 2020

(65) Prior Publication Data
US 2022/0208199 A1      Jun. 30, 2022

(51) Int. Cl.
   G10L 17/22      (2013.01)
   G10L 17/02      (2013.01)
   G10L 21/028     (2013.01)
   G10L 25/57      (2013.01)

(52) U.S. Cl.
   CPC .............. *G10L 17/22* (2013.01); *G10L 17/02* (2013.01); *G10L 21/028* (2013.01); *G10L 25/57* (2013.01)

(58) Field of Classification Search
   CPC ....... G10L 17/22; G10L 25/57; G10L 21/028; G10L 17/02
   See application file for complete search history.

(56) References Cited

U.S. PATENT DOCUMENTS

| 9,954,994 B2 * | 4/2018 | Koo ..................... G06F 1/1632 |
| 11,217,255 B2 * | 1/2022 | Kim ....................... G10L 15/22 |
| 2016/0070580 A1 | 3/2016 | Johnson et al. |

(Continued)

FOREIGN PATENT DOCUMENTS

| JP | 2008-78696 A | 4/2008 |
| JP | 2017-538985 A | 12/2017 |

OTHER PUBLICATIONS

International Search Report and Written Opinion mailed on Jul. 2, 2019, received for PCT Application PCT/JP2019/016597, Filed on Apr. 18, 2019, 9 pages including English Translation.

*Primary Examiner* — Brian L Albertalli
(74) *Attorney, Agent, or Firm* — XSENSUS LLP

(57) ABSTRACT

A digital assistant function is provided to individual users even when a primary device having the digital assistant function is at a location away from a hand of a user. An information processing device that relays sound data to a primary device that executes a digital assistant process includes: a sound acquiring unit that acquires surrounding sounds as sound data; a destination device determination unit that determines a destination primary device which is the primary device that is a destination of the sound data; a transmitting and receiving unit that transmits the sound data to the destination primary device and receives, from the destination primary device, a result of a digital assistant process executed depending on the sound data as a reply; and a reply presentation unit that presents the reply received at the transmitting and receiving unit.

20 Claims, 17 Drawing Sheets

(56) References Cited

U.S. PATENT DOCUMENTS

| | | | | |
|---|---|---|---|---|
| 2018/0293981 A1* | 10/2018 | Ni | ............................ | G10L 17/22 |
| 2018/0337799 A1* | 11/2018 | Levi | ........................ | G06F 3/167 |
| 2019/0361408 A1* | 11/2019 | Tokuchi | ............... | G05B 13/028 |
| 2020/0143017 A1* | 5/2020 | Yoon | ........................ | G10L 15/22 |
| 2020/0294522 A1* | 9/2020 | Zhang | .................... | H04R 1/406 |

* cited by examiner

FIG. 6A

| USER ID | PRIMARY DEVICE ID | ACCESS INFORMATION | COOPERATION FLAG | PRIMARY DEVICE TYPE | PRIMARY DEVICE NAME |
|---|---|---|---|---|---|
| USER A | 300a-1 | xxA1.xxx | ON | SMARTPHONE | AAS |
| USER B | 300b | xxB.xxx | OFF | TABLET | BBB |
| USER C | 300c | xxC.xxx | ON | SMARTPHONE | CCC |
| USER A | 300a-2 | xxA2.xxx | ON | TABLET | AAT |

FIG. 6B

| USER ID | VOICE INFORMATION | FACE IMAGE |
|---|---|---|
| USER A | yyA.yyy | zzA.zzz |
| USER B | yyB.yyy | zzB.zzz |
| USER C | yyC.yyy | zzC.zzz |

FIG. 10A
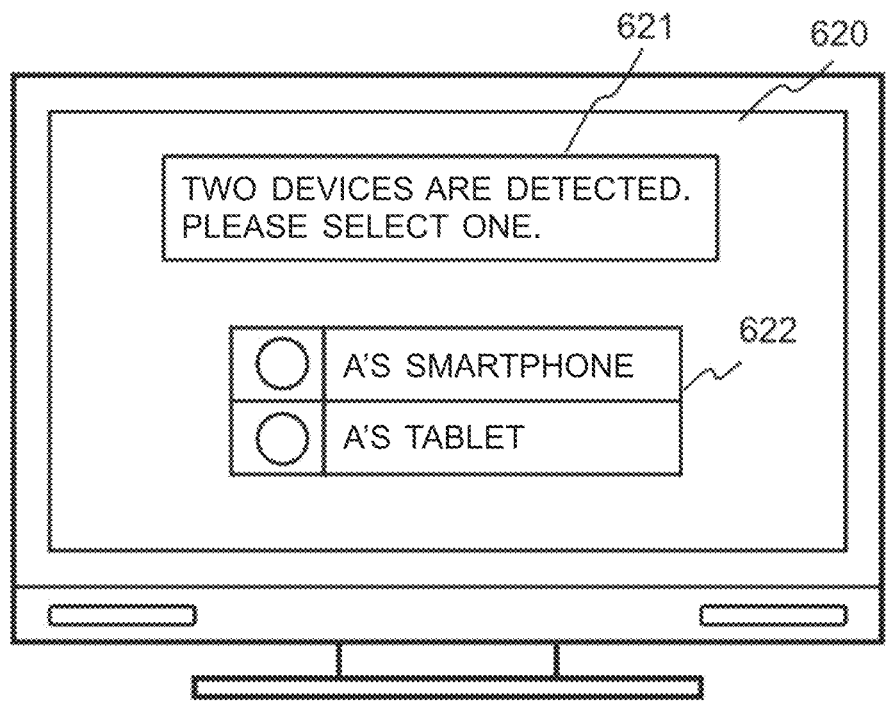
FIG. 10B
| SECONDARY DEVICE ID | VIDEO OUTPUT DESTINATION DEVICE ID |
|---|---|
| SS01 | TV100 |
| SS02 | TV102 |
FIG. 10C
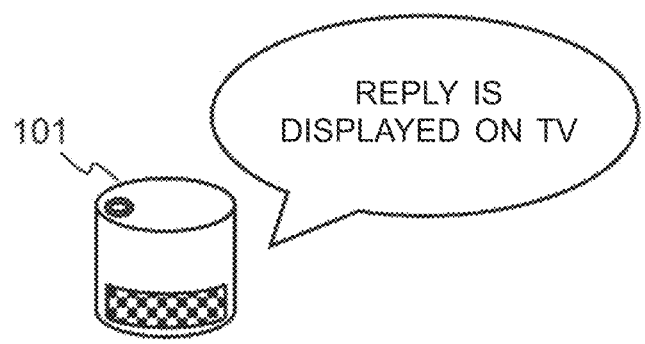

INFORMATION PROCESSING DEVICE AND DIGITAL ASSISTANT SYSTEM

CROSS-REFERENCE TO RELATED APPLICATIONS

The present application is based on PCT filing PCT/JP2019/016597, filed Apr. 18, 2019, the entire contents of which is incorporated herein by reference.

TECHNICAL FIELD

The present invention relates to a digital assistant technique that executes a necessary task and provides a result to a user through dialogs with the user. Specifically, the present invention relates to a technique that remotely implements a digital assistant function.

BACKGROUND ART

There is a system that implements an assistant function with a primary device having the digital assistant function and a secondary device having no digital assistant function. For example, Patent Literature 1 provides one or a plurality of techniques and/or systems for providing personal assistant information. There is disclosed a system, for example, in which a primary device can establish a communication channel with a secondary device. The primary device can receive a context associated with a user. The primary device, which can be enabled with a digital personal assistant function or access to such a function, can invoke the digital personal assistant function to evaluate the context to generate a personal assistant result. The personal assistant result can be provided from the primary device to the secondary device for presentation to the user. In this way, the secondary device appears to provide the digital personal assistant function even though the secondary device does not include such a function or have access to such function (extracted from Abstract).

CITATION LIST

Patent Literature

Patent Literature 1: Japanese Unexamined Patent Application Publication No. 2017-538985

SUMMARY OF INVENTION

Technical Problem

In the case where a digital assistant function is used with a voice command in a portable device such as a smartphone, the digital assistant function is usable with no problem when a device is available at hand. However, a portable device is often placed at a location away from a user. For example, after a user comes home, the user often leaves his/her device for charging.

According to the technique disclosed in Patent Literature 1, the reception of a voice command by a user is performed through a primary device including a digital assistant function. Therefore, in the case where the primary device is not at the user's hand, it is not possible to use the primary device.

The technique disclosed in Patent Literature 1 has a premise that a user is one person. However, at homes and the like, each of family members has a primary device such as a smartphone having a digital assistant function. Family members sometimes possess a plurality of primary devices. In other words, there are possibly a plurality of users and the number of primary devices equal to or more than the number of the users. However, the technique disclosed in Patent Literature 1 does not assume use in such an environment.

The present invention has been made under the circumstances. It is an object to provide a technique capable of providing a digital assistant function to individual users even when a device having the digital assistant function is at a location away from the user's hand.

Solution to Problem

The present invention is an information processing device that relays acquired sound data to a primary device configured to execute a digital assistant process, the information processing device including: a sound acquiring unit that acquires surrounding sounds as the sound data; a destination device determination unit that determines a destination primary device which is the primary device that is a destination of the sound data; a transmitting and receiving unit that transmits the sound data to the destination primary device and receives, from the destination primary device, a result of a digital assistant process executed depending on the sound data as a reply; and a reply presentation unit that presents the reply received at the transmitting and receiving unit.

The present invention is a digital assistant system that includes a secondary device and a primary device and provides a result of a digital assistant process executed through the secondary device, the secondary device including: a sound acquiring unit that acquires surrounding sounds as sound data; a destination device determination unit that determines a destination primary device, which is the primary device to which the sound data is transmitted; a transmitting and receiving unit that transmits the sound data to the destination primary device and receives, from the destination primary device, a result of the digital assistant process executed depending on the sound data as a reply; and a reply presentation unit that presents the reply received at the transmitting and receiving unit. The primary device includes a data receiving unit that receives the sound data from the secondary device, an assistant unit that executes the digital assistant process depending on the sound data received at the data receiving unit and outputs a processed result as the reply, and a reply transmitting unit that returns the reply outputted from the assistant unit to the secondary device which is a source of the sound data.

Advantageous Effects of Invention

According to the present invention, it is possible to provide a digital assistant function to individual users even when a device having the digital assistant function is at a location away from the user's hand. Problems, configurations, and effects other than those described above will become apparent from the description of embodiments below.

BRIEF DESCRIPTION OF DRAWINGS

FIG. 6A is an illustration for explaining a cooperation information database according to the first embodiment, and FIG. 6B is an illustration for explaining a user information database according to the first embodiment.

FIG. 10A is an example of a screen according to an exemplary modification of the first embodiment, 10B is an example of a corresponding device registration database according to an exemplary modification of the first embodiment, and 10C is an illustration for explaining an example of an output from the secondary device according to the exemplary modification of the first embodiment.

DESCRIPTION OF EMBODIMENT

First Embodiment

In the following, a first embodiment of the present invention will be described. In the entire specification, components having the same functions are designated with the same reference signs, and redundant descriptions will be omitted.

Figure 1A:
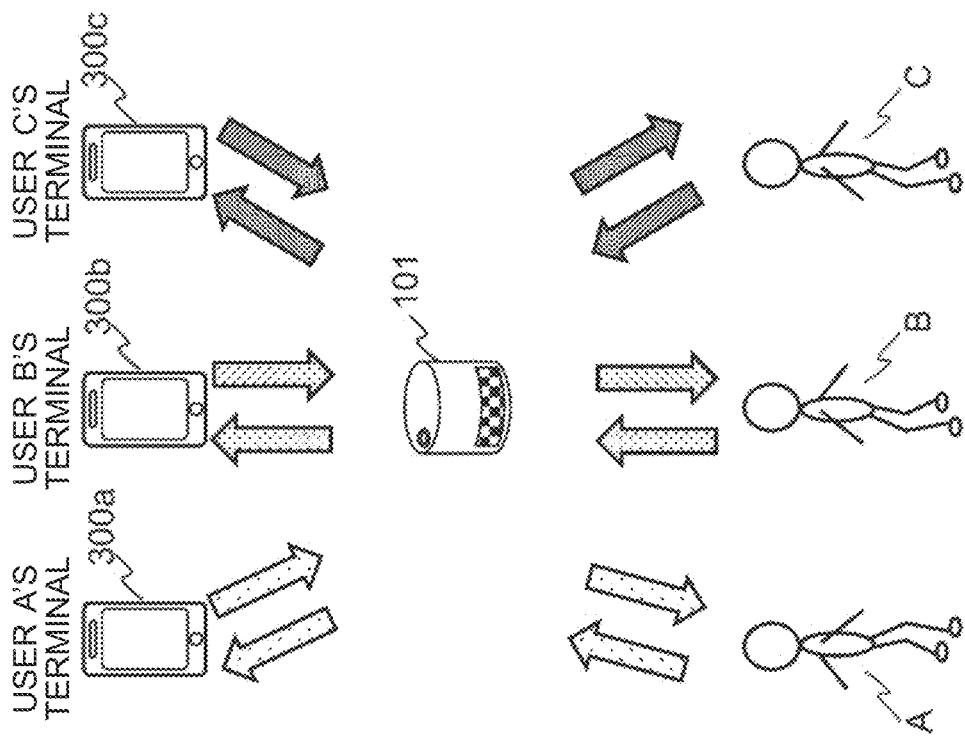
FIGS. 1A and 1B are illustrations for explaining the outline of a first embodiment.
Figure 1B:
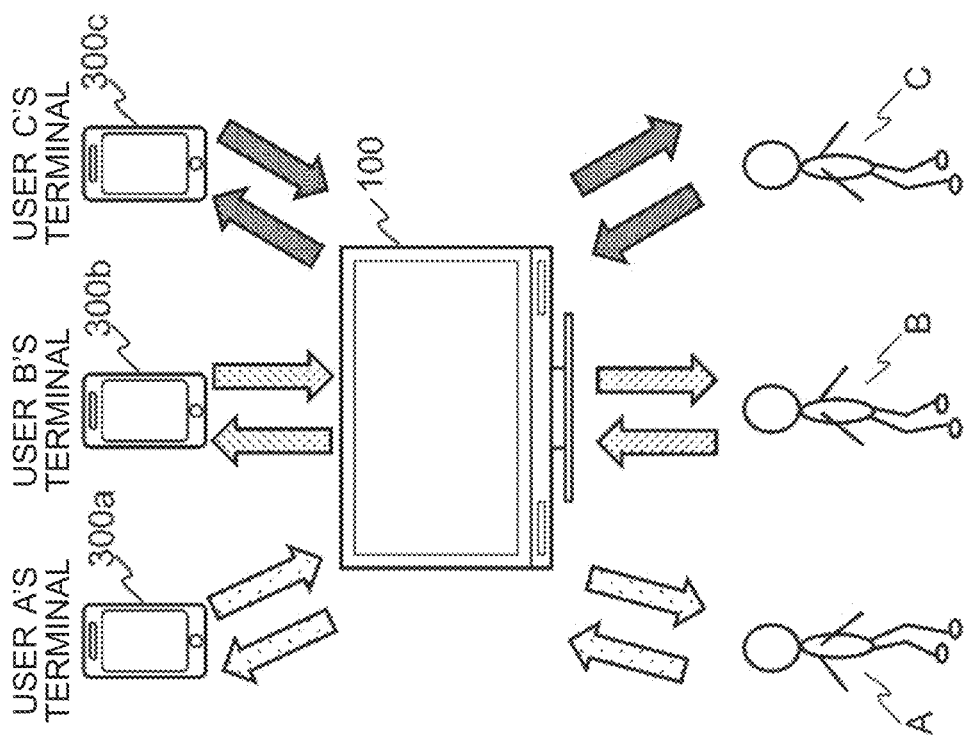

First, the outline of the process according to the present embodiment will be described. FIG. 1A and FIG. 1B are diagrams illustrating the outline of processes according to the present embodiment.

The present embodiment remotely provides a digital assistant function that executes a necessary task and provides a result to a user through dialogs with the user. Specifically, the present invention provides a relay device in which a voice command from a user is relayed to a portable information processing device such as a smartphone having a digital assistant function and a result is provided to the user. In the following, a portable information processing device having a digital assistant function is referred to as a primary device.

In a residence and the like, a primary device is sometimes placed at a location away from a user. For example, this is the case where a user is in a living room, and the primary device is connected to a charger in a room other than the living room, for example.

In the present embodiment, in such a case, for example, a video display device such as a television (TV) set disposed in the living room is caused to function as a relay device for a digital assistant function. That is, the television set relays a voice command to the smartphone of a person uttering a voice as the voice command. In the following, a device that functions as a relay device is referred to as a secondary device.

In the present embodiment, as shown in FIG. 1A, it is assumed that multiple users A, B, and C possess their primary devices 300a, 300b, and 300c, respectively. The television set then functions as a secondary device 100. It should be noted that the secondary device that functions as the relay device having the digital assistant function may be a smart speaker 101, for example. FIG. 1B shows a schematic diagram of the present embodiment in this case.

As shown in FIG. 1A and FIG. 1B, upon receiving a voice command from user A, the secondary device 100 (or 101) relays the voice command to the primary device 300a of user A. The secondary device 100 (or 101) then receives and outputs a reply from the primary device 300a. Upon receiving a voice command from user B, the secondary device 100 (or 101) relays the voice command to the primary device 300b of user B, and outputs a reply received from the primary device 300b. Similarly, also in the case of user C, upon receiving a voice command, the secondary device 100 (or 101) relays the voice command to the primary device 300c of user C, and outputs the obtained reply.

In the case where the secondary device is the television set 100, for example, the output of a reply is a sound output from the speaker, a representation on a display, and the like. In the case where the secondary device is the smart speaker 101, the output of a reply is a sound output from the speaker, and the like. In the following, an assistant system having the functions described above will be described.

[Overall Configuration of the System]

Figure 2:
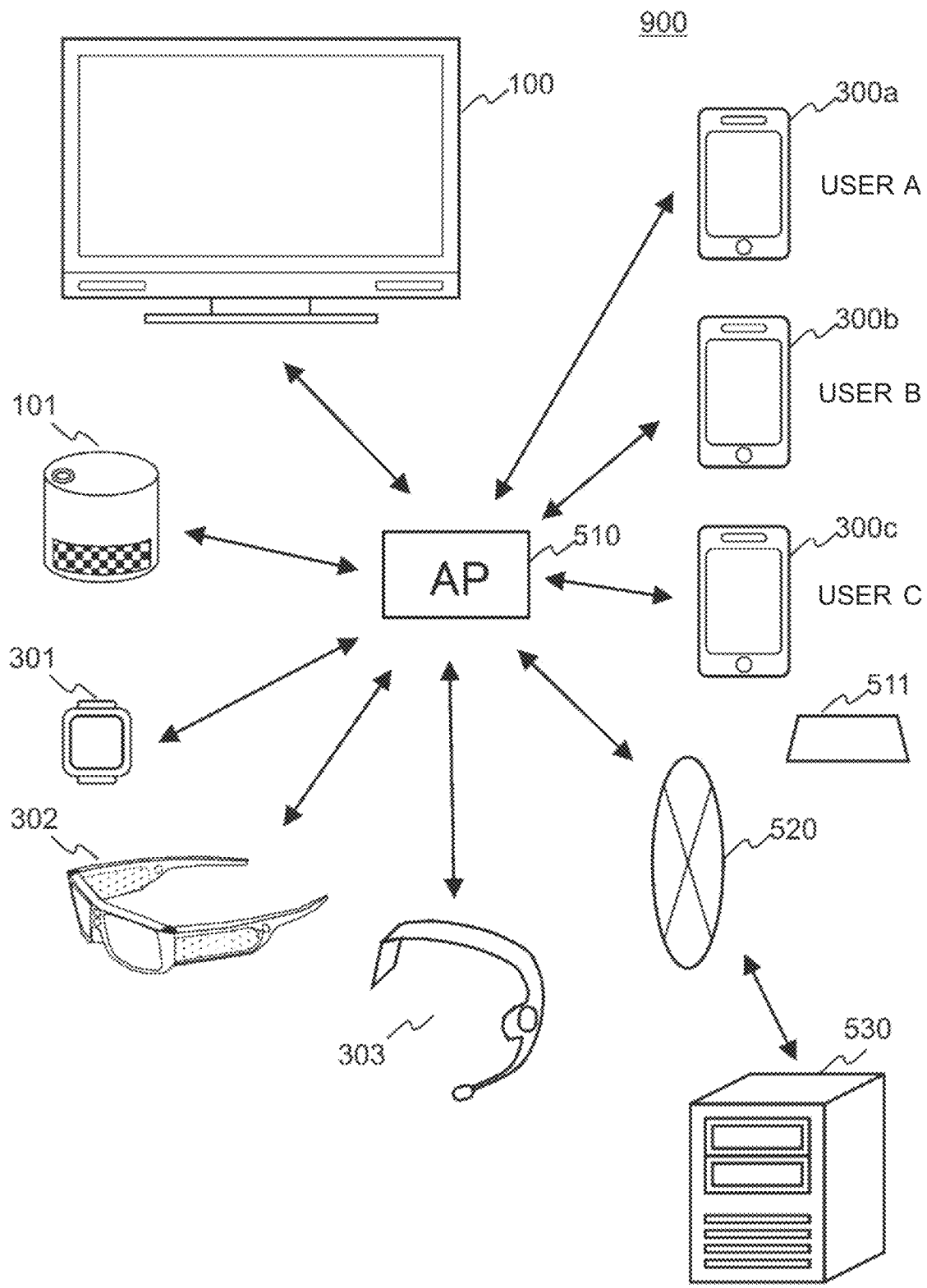
FIG. 2 is a diagram of the system configuration of an assistant system according to the first embodiment.

First, an overall configuration of an assistant system 900 according to the present embodiment will be described. FIG. 2 is a diagram of the overall configuration of the assistant system 900 according to the present embodiment.

As shown in the present drawing, the assistant system 900 according to the present embodiment includes the secondary device 100, a primary device 300, and an access point (AP) 510. It should be noted that the assistant system 900 according to the present embodiment may further include a server 530 connected to the access point 510 via an external network 520. The assistant system 900 may include a charging base 511 that charges the primary device 300.

The primary device 300 is a device that provides a digital assistant function to individual users. The primary device 300 only has to be a device including a communication function, a user interface, and an information processing function.

In the present embodiment, as the primary device 300, for example, portable information processing devices 300a, 300b, and 300c such as a smartphone, a smart watch 301, a head mounted display (HMD) 302, a wireless headphone 303, and the like are used. In the following, in the present embodiment, as the primary device 300, the case will be described as an example in which a smartphone is used. It should be noted that the number of the primary devices 300 is not limited.

The secondary device 100 is a device that is an interface for individual users. In the present embodiment, the secondary device 100 accepts a voice by a user, identifies a person uttering the voice, and transfers the voice to the primary device 300 of the identified uttering person. Upon receiving a processed result from the primary device 300, the secondary device 100 presents the processed result to the user. The number of the secondary devices 100 is also not limited.

In the present embodiment, for example, as the secondary device 100, a television set, the smart speaker 101, and the like are used. In the following, in the present embodiment, as the secondary device 100, the case will be described as an example of using a television set having a display that is a display device.

The access point 510 is a device that interconnects wireless LAN clients to each other and that connects wireless LAN clients to another network. In the present embodiment, the primary device 300 is connected to the secondary device 100.

[Hardware Configuration of the Secondary Device]

Figure 3:
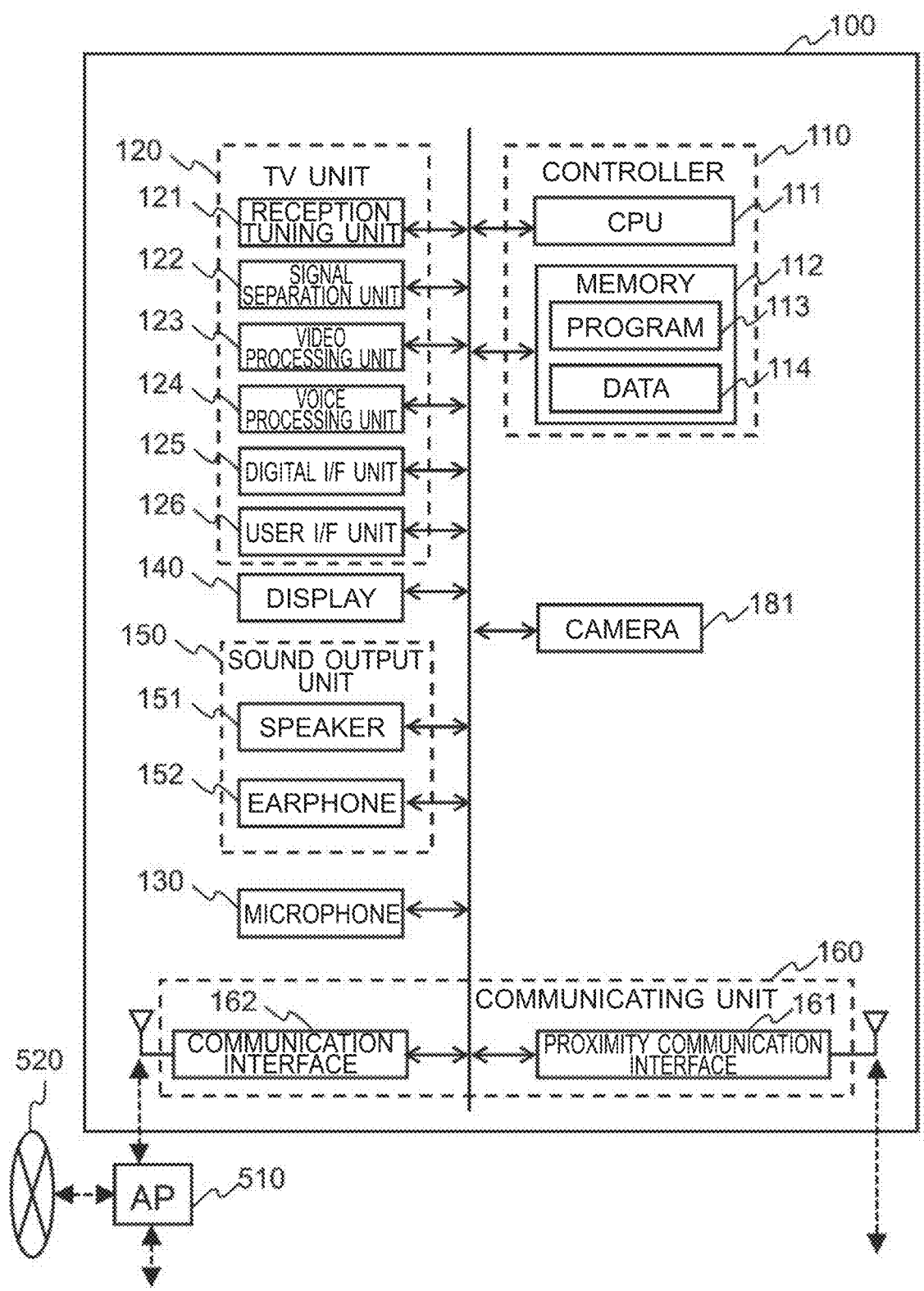
FIG. 3 is a diagram of the hardware configuration of a secondary device according to the first embodiment.

Next, the secondary device 100 will be described. FIG. 3 is a diagram of the hardware configuration of the secondary device 100 according to the present embodiment.

As shown in the present drawing, the secondary device 100 according to the present embodiment includes a controller 110, a TV unit 120, a microphone (microphone) 130, a display 140, a sound output unit 150, and a communicating unit 160. Further, the secondary device 100 may includes a camera 181.

The controller 110 performs overall control on the secondary device 100. In the present embodiment, the controller 110 includes a CPU 111 and a memory 112. The memory 112 includes a RAM and a ROM, and a program 113 and data 114 are stored in the ROM.

The TV unit 120 implements typical functions as a video display device. For example, the TV unit 120a includes a reception tuning unit 121, a signal separation unit 122, a video processing unit 123, a voice processing unit 124, a digital interface (I/F) unit 125, and a user interface (I/F) unit 126.

The reception tuning unit 121 receives a broadcast signal, and outputs the signal to the signal separation unit 122. The reception tuning unit 121 includes an RF tuner and the like, and selects, from the broadcast signal, a channel specified by a user with a remote controller and the like through the user I/F unit 126. The reception tuning unit 121, then, demodulates the selected broadcast signal and transmits the selected broadcast signal as the reception data of the broadcast program to the signal separation unit 122. The reception data of the broadcast program is data multiplexed with video data, voice data, broadcast data, and the like.

The signal separation unit 122 separates video data and voice data from reception data, and sends the video data and the voice data to the video processing unit 123 and the voice processing unit 124. The video data and the voice data are coded to compress the information volume of original data.

The video processing unit 123 decompresses and decodes the video data, obtains the video data of a TV broadcast program, and outputs the video data from the display 140. It should be noted that at this time, video data to be displayed may be managed in a unit of a plane, and an OSD (On Screen Display) plane, for example, may be superposed on the video data of the broadcast program.

The voice processing unit 124 decompresses and decodes the voice data, obtains the voice data of the TV broadcast program, and outputs the voice data from the sound output unit 150.

The digital I/F unit 125 has HDMI (registered trademark), or the digital I/F function of a USB, for example. The digital I/F unit 125 accepts the content data of a video and a voice as external inputs, and outputs the content data to the display 140 and the sound output unit 150 through the video processing unit 123 and the voice processing unit 124.

The microphone 130 acquires outside sounds.

The display 140 displays the video data processed in the secondary device 100.

The sound output unit 150 outputs the sound data processed in the secondary device 100. The sound output unit 150 may include a speaker 151 and an earphone 152, for example.

The communicating unit 160 includes an encoder circuit, a decoder circuit, an antenna, and the like, and transmits and receives data (data communication) to and from another device. The communicating unit 160 includes a communication interface 162 that transmits and receives data with another device through the AP 510 and a proximity communication interface 161 that directly communicates with another device. For example, the connection to the AP 510 is performed by radio communication methods such as Wi-Fi (registered trademark) and other communication methods.

The camera 181 acquires images of the surroundings of the secondary device 100.

[Hardware Configuration of the Primary Device]

Figure 4:
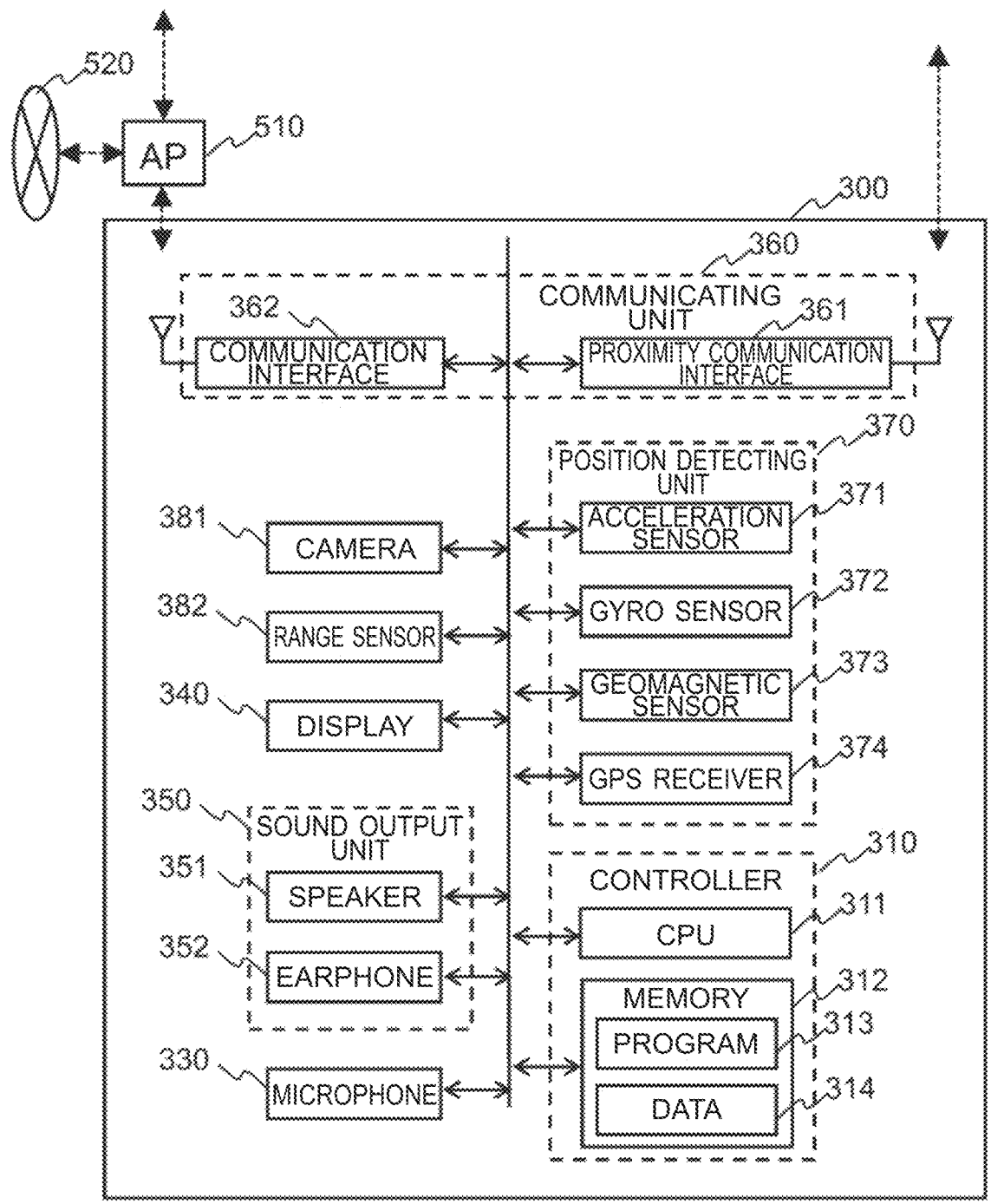
FIG. 4 is a diagram of the hardware configuration of a primary device according to the first embodiment.

Next, the hardware configuration of the primary device 300 will be described. FIG. 4 is a diagram of the hardware configuration of the primary device 300 according to the present embodiment.

As shown in the present drawing, the primary device 300 according to the present embodiment includes a controller 310, a microphone 330, a display 340, a sound output unit 350, a communicating unit 360, a position detecting unit 370, a camera 381, and a range sensor 382.

Since these components basically have similar functions as the components having the same names of the secondary device 100, here, the details will not be described.

It should be noted that the position detecting unit 370 detects the present location, tilt, velocity, and the like of the primary device 300. As a sensor that detects these pieces of information, the position detecting unit 370 includes, for example, an acceleration sensor 371, a gyro sensor 372, a geomagnetic sensor 373, and a GPS receiver 374.

The camera 381 acquires images of the surroundings of the primary device 300. It should be noted that the primary device 300 may includes, as the camera 381, two types of cameras having the orientation of the center axis of the shooting area different at an angle of 180 degrees, e.g., an outward camera and an inward camera. The range sensor 382 acquires a distance to an object in the surroundings of the primary device 300.

Functional Block of the Secondary Device

Next, the functional configuration of the secondary device 100 according to the present embodiment will be described. As described above, in addition to the function as a typical television set, the secondary device 100 according to the present embodiment functions as the user interface of the digital assistant function. That is, the secondary device 100 relays the voice of a user is relayed to the primary device 300 of the corresponding user.

In the following, the secondary device 100 functioning as the user I/F of the digital assistant function of the primary device 300 is referred to as digital assistant cooperation between the secondary device 100 and the primary device 300, or simply referred to as cooperation. The primary device 300 performs a digital assistant process only to sound data received from the secondary device 100 in a cooperative state, for example, and provides a reply. It should be noted that the state in which the secondary device 100 is ready for digital assistant cooperation is referred to as a cooperation mode. Similarly, the state in which the primary device 300 is ready for digital assistant cooperation is also referred to as a cooperation mode.

In the following, the functional blocks of the secondary device 100 according to the present embodiment that implement the above-described digital assistant cooperation function will be described. Here, in the function of the secondary device 100, the description will be made focused only on the digital assistant cooperation function.

Figure 5:
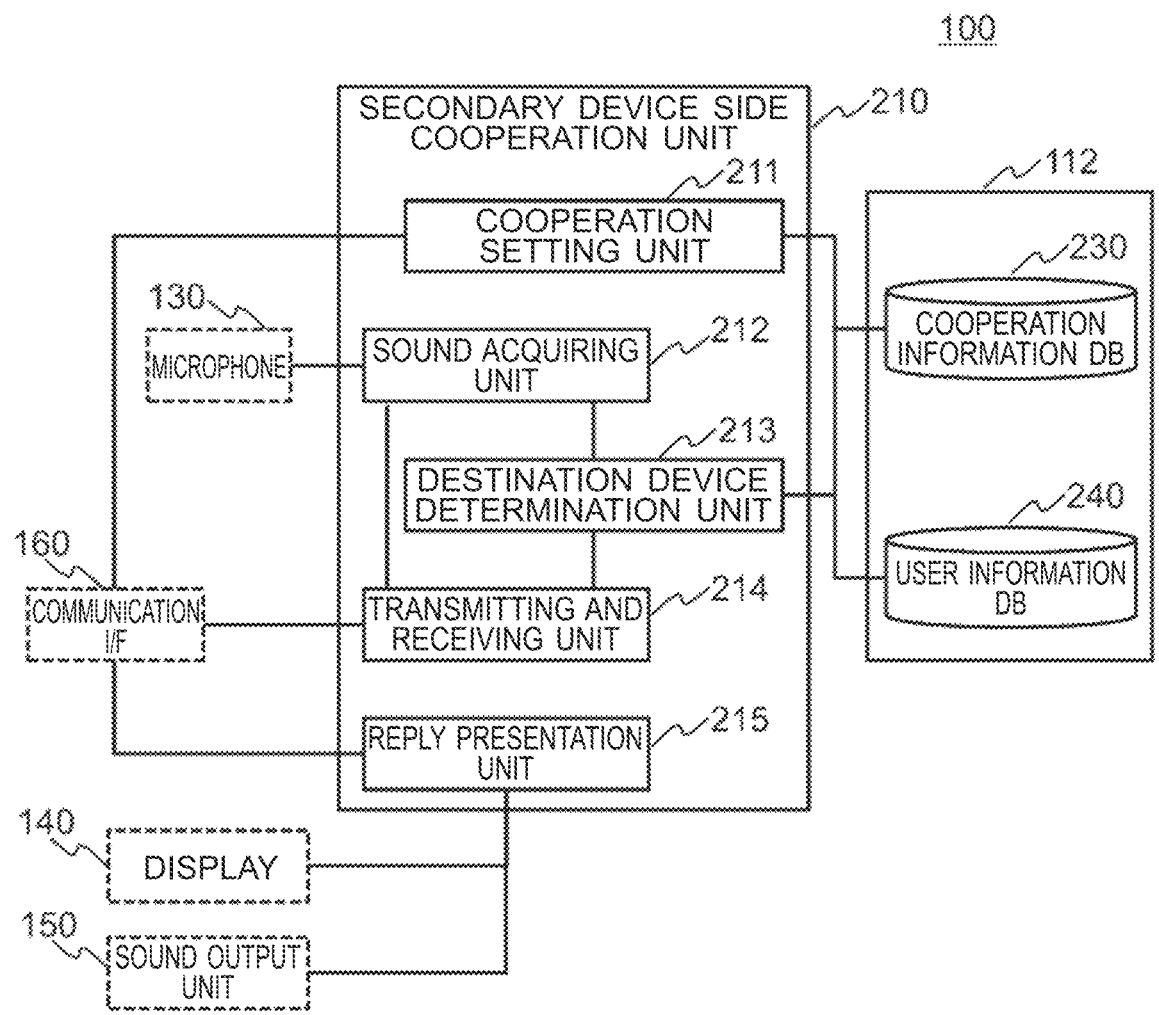
FIG. 5 is a functional block diagram of the secondary device according to the first embodiment.

As shown in FIG. 5, the secondary device 100 according to the present embodiment includes a secondary device side cooperation unit 210 as a digital assistant cooperation function. The secondary device side cooperation unit 210 includes a cooperation setting unit 211, a sound acquiring unit 212, a destination device determination unit 213, a transmitting and receiving unit 214, and a reply presentation unit 215.

These functions are implemented by loading the program 113 stored in the ROM of the memory 112, for example, in the RAM of the CPU 111 or the memory 112, for example, for execution.

The memory 112 further stores, as the data 114 used for processing these processes, a cooperation information database (DB) 230 and a user information database (DB) 240.

The cooperation setting unit 211 manages the cooperative state of the primary device 300 that possibly performs digital assistant cooperation. In the present embodiment, the cooperation information DB 230 manages the cooperative state.

FIG. 6A shows an example of the cooperation information DB 230. The cooperation information DB 230 stores, for each user, information on a primary device 300 of the corresponding user and information whether or not to establish cooperation with the corresponding primary device 300.

Specifically, as shown in the present drawing, to each user ID 231, a primary device ID 232, access information 233, and a cooperation flag 234 are registered.

The user ID 231 is information that identifies a user. The primary device ID 232 is information that identifies a primary device 300 used by the user. The access information 233 is information such as an IP address that accesses the primary device 300 through the AP 510.

The user ID 231, the primary device ID 232, and the access information 233 are registered by the user in advance. For example, as described later, these pieces of information are set at the primary device 300 by performing a cooperation initialization process. These pieces of information are set at the time of initialization, and then held in the memory 112.

It should be noted that as information on the primary device 300, a primary device type 235 and a primary device name 236 may be further registered. The primary device type 235 is a type of a primary device. For example, a smartphone, a tablet, a smart watch, and the like are registered. The primary device name 236 is a name of the primary device 300. The primary device name 236 may be given to the primary device 300 in advance, or may be originally given by a user. These pieces of information are also registered by a user.

The cooperation flag 234 stores information that indicates whether or not the state is in a cooperative state with the primary device 300.

In the present embodiment, as described later, upon recognizing the AP 510, the primary device 300 transmits a cooperation request command to the secondary device 100 through the AP 510. Upon receiving the cooperation request command from the primary device 300, the cooperation setting unit 211 sets the cooperation flag 234 of the data of the primary device 300 of a transmission source, in the cooperation information DB 230, and returns a cooperation establishment command to the primary device 300 of a transmission source. It should be noted that in the present drawing, data to which the e.g., cooperation flag 234 is set is indicated by ON, whereas data to which no cooperation flag 234 is not set is indicated by OFF. The primary device 300 with the cooperation flag 234 turned ON is a primary device 300 on which digital assistant cooperation is established.

It should be noted that the cooperation request command includes the primary device ID 232 and the access information 233 of the primary device 300. The cooperation setting unit 211 identifies data to which the cooperation flag 234 is set based on these pieces of information.

The cooperation establishment command to be returned includes the secondary device ID that is identification information on the secondary device 100 and the access information.

The sound acquiring unit 212 generates sound data from a sound acquired through the microphone 130, and outputs the sound to the destination device determination unit 213. The sound acquiring unit 212 outputs the sound data to the transmitting and receiving unit 214 in response to an instruction from the destination device determination unit 213.

In the present embodiment, the sound acquiring unit 212 performs a noise removal process to the sound acquired through the microphone 130, and generates sound data. The noise removal process performed here is a process in which a sound at a certain sound level or below is removed, for example, or in which components outside a predetermined frequency range (low frequencies or high frequencies), or the like. It should be noted that the sound acquiring unit 212 may perform the noise removal process using a publicly known the technique such as a spectral subtraction method.

The destination device determination unit 213 determines the primary device 300 that is the destination of the sound data as a destination primary device. First, upon receiving the sound data from the sound acquiring unit 212, the destination device determination unit 213 analyzes the sound, makes reference to the user information DB 240, and identifies a user who is an uttering person. It should be noted that if the user cannot be identified, the destination device determination unit 213 discriminates that the data is not voice data, and does not determine the destination primary device.

Here, an example of the user information DB 240 used when the destination device determination unit 213 identifies a user will be described. The user information DB 240 stores information that identifies a user by a sound. In the present embodiment, voice information 242 is registered in association with the user ID 241 that is information for identifying a user. It should be noted that a face image 243 may be further registered.

The voice information 242 may be the actual voice data of a user, for example. It should be noted that the destination device determination unit 213 checks the voice information 242 against the received sound data using a voiceprint, a frequency, and the like, and identifies the user. Therefore, the voice information 242 is not necessarily the voice data of a user itself, and the voice information 242 only has to be information that can compare voiceprints or frequencies. The actual voice data may be stored in another region, or may be access information to a corresponding region.

It should be noted that the voice information 242 is registered by a user in advance. The same applies to the face image 243 as well.

The destination device determination unit 213 according to the present embodiment makes reference to the user information DB 240, and identifies voice information 242 matched with the received sound data within a predetermined tolerance. The destination device determination unit 213 then extracts the user ID 241 in association with the identified voice information 242 from the user information DB 240.

Upon identifying the user who is an uttering person of the sound data, the destination device determination unit 213 identifies the primary device 300 of the user, and determines the primary device 300 as the destination primary device. Here, the destination device determination unit 213 makes reference to the cooperation information DB 230, and determines the primary device 300 registered in association with the extracted user ID 241 and the same user ID 231 as the destination primary device. The determined result is outputted to the sound acquiring unit 212. In the present embodiment, the destination device determination unit 213 outputs, for example, the primary device ID 232 and the access information 233 to the sound acquiring unit 212 as the determined result.

It should be noted that in the case where the voice information 242 matched with the received sound data within a predetermined tolerance is not registered in the user information DB 240, the destination device determination unit 213 determines that the acquired sound data is not a sound by the user, and outputs nothing.

In the case where the cooperation flag 234 of the primary device 300 determined as the destination primary device is OFF, no cooperation is established between the corresponding primary device 300 and the secondary device 100. Therefore, in this case, the destination device determination unit 213 may notify the user about this. For example, the destination device determination unit 213 displays on the display 140 that cooperation is not established.

It should be noted that in the case where the primary device ID 232 and the access information 233 is received from the destination device determination unit 213, the sound acquiring unit 212 instructs the transmitting and receiving unit 214 to transmit the sound data toward the corresponding primary device 300.

The transmitting and receiving unit 214 transmits and receives data through the communication interface 162. In the present embodiment, in accordance with the instruction from the sound acquiring unit 212, the sound data is transmitted as a relay sound to the primary device 300. Upon receiving a processed result from the primary device 300, the transmitting and receiving unit 214 outputs the processed result to the reply presentation unit 215.

The reply presentation unit 215 outputs the processed result to the user through the display 140 and/or the sound output unit 150.

Functional Block of the Primary Device

Next, a functional block of the primary device 300 according to the present embodiment, which implements the above-described digital assistant cooperation function, will be described. Here, in the functionalities of the primary device 300, the description will be made focused only on the digital assistant cooperation function.

Figures 7A, 7B:
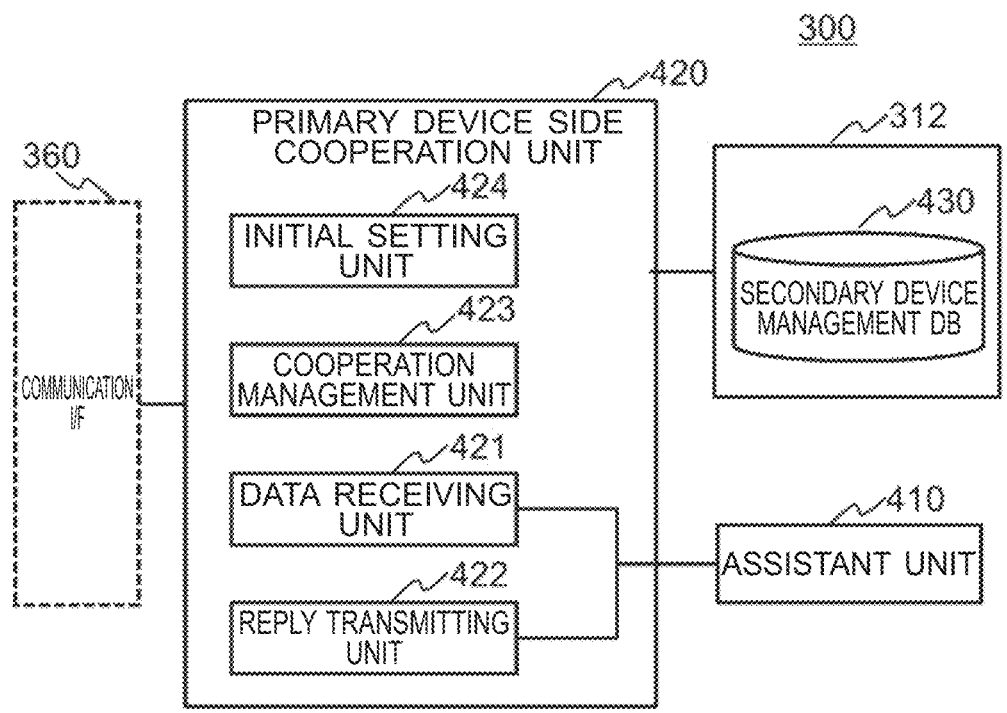
FIG. 7A is a functional block diagram of the primary device according to according to the first embodiment, and 7B is an illustration for explaining a secondary device management database according to the first embodiment.

As shown in FIG. 7A, the primary device 300 according to the present embodiment includes an assistant unit 410 and a primary device side cooperation unit 420 as a function that implements digital assistant cooperation. The primary device side cooperation unit 420 includes a data receiving unit 421, a reply transmitting unit 422, a cooperation management unit 423, and an initial setting unit 424.

These functions are implemented by a CPU 311 loading a program 313 stored in the ROM of a memory 312, for example, in the RAM of the memory 312, for example.

The memory 312 further stores a secondary device management database (DB) 430 that is data 314 used for processing these processes.

The initial setting unit 424 performs the cooperation initialization process. In the present embodiment, prior to execution of the digital assistant cooperation process, the information of the device itself (primary device 300) is registered on the secondary device 100 that performs cooperation. As described above, the primary device ID 232 and the access information 233 of the primary device 300 that is the device itself are registered.

The registration is performed in which the above-described pieces of information are transmitted to the secondary device 100 together with a registration request through the proximity communication interface 161 and a proximity communication interface 361 near the secondary device 100, for example. At this time, the secondary device ID that is information identifying the secondary device 100 as information on the secondary device 100 side and the access information may be acquired. These acquired pieces of information may be managed in a secondary device management DB 430, described later, for example.

Here, FIG. 7B shows an example of the secondary device management DB 430. As shown in the present drawing, the secondary device management DB 430 stores information necessary for cooperation with each secondary device 100. Specifically, the secondary device ID 431 that is information identifying the secondary device 100, its access information 432 and a cooperation flag 433 indicating whether cooperation is set are stored. The cooperation flag 433 is set by the cooperation management unit 423, described later.

It should be noted that the secondary device ID 431 and the access information 432 may both set by the cooperation management unit 423, described later. That is, the identification information and the access information of the secondary device included in the cooperation establishment command returned in response to the cooperation request command may be stored. After the cooperation establishment command is received, in regard to data to which the secondary device ID and the access information 432 are set, the cooperation flag 433 is set to ON until the cooperation is released.

The cooperation management unit 423 manages the secondary device 100 subjecting to cooperation, and manages whether or not a digital assistant cooperation state is established with the corresponding secondary device 100.

The cooperation management unit 423 first manages whether or not the primary device 300 that is the user device is in a state ready for digital assistant cooperation. In the present embodiment, the cooperation management unit 423 determines, for example, whether the device is accessible to the AP 510 of the assistant system 900, i.e., discriminates whether the AP 510 is recognized or not.

In the case where the AP 510 is recognized, the cooperation management unit 423 discriminates that digital assistant cooperation is ready.

In the case where it is discriminated that the state is ready for digital assistant cooperation, i.e., in the case where the AP 510 is recognized, the cooperation management unit 423 outputs a cooperation request command through the AP 510.

Upon receiving the cooperation request command, on the secondary device 100 side, as described above, the cooperation establishment command is transmitted to the primary device 300 of a transmission source. It should be noted that in the case where multiple devices, each functioning as the secondary device 100, are connected through the AP 510, the cooperation establishment command is transmitted from each of the secondary devices 100.

Upon receiving the cooperation establishment command from the secondary device 100, the cooperation management unit 423 establishes cooperation with the corresponding secondary device 100 to achieve the cooperative state with the corresponding secondary device 100. Specifically, the cooperation management unit 423 sets the cooperation flag 433 in the data of the secondary device 100 of a transmission source (the flag is turned to ON). It should be noted that the data of the secondary device 100 of a transmission source is identified with the secondary device ID and the access information included in the cooperation establishment command.

When the AP 510 is not recognized, the cooperation management unit 423 releases the cooperation flag 433. It should be noted that the cooperation flag 433 is set in the RAM and the like such that the cooperation flag 433 is released when the power supply is turned OFF, for example.

The data receiving unit 421 receives the relay sound through a communication interface 362, and in the case where the state is in the cooperative state with the secondary device 100 of a transmission source, the received relay sound is outputted to the assistant unit 410. Whether or not the state is in the cooperative state is discriminated from the cooperation flag 433 of the secondary device management DB 430. It should be noted that upon receiving a relay sound from the secondary device 100 in the cooperative state to which no communication path is established yet, the data receiving unit 421 establishes a communication path with the secondary device 100 of a transmission source.

The assistant unit 410 analyzes the relay sound similarly to a sound acquired with a typical microphone 330 for performing the assistant process, and outputs a reply. At this time, information may be acquired from the server 530 and the like is connected to the external network 520 through the AP 510 as necessary.

The reply transmitting unit 422 transmits the reply outputted from the assistant unit 410 to the secondary device 100 having the communication path stablished. The transmission is performed through the communication interface 362.

In addition to the content of the reply, the reply transmitting unit 422 may transmit the information of the sound type, the character, and the like of an assistant set in the assistant function of the primary device 300 with the information superposed on the reply.

The reply presentation unit 215 of the secondary device 100 presents the reply with the sound type of the primary device 300 based on these pieces of information or superposes character information.

[Digital Assistant Cooperation Process]

Figure 8:
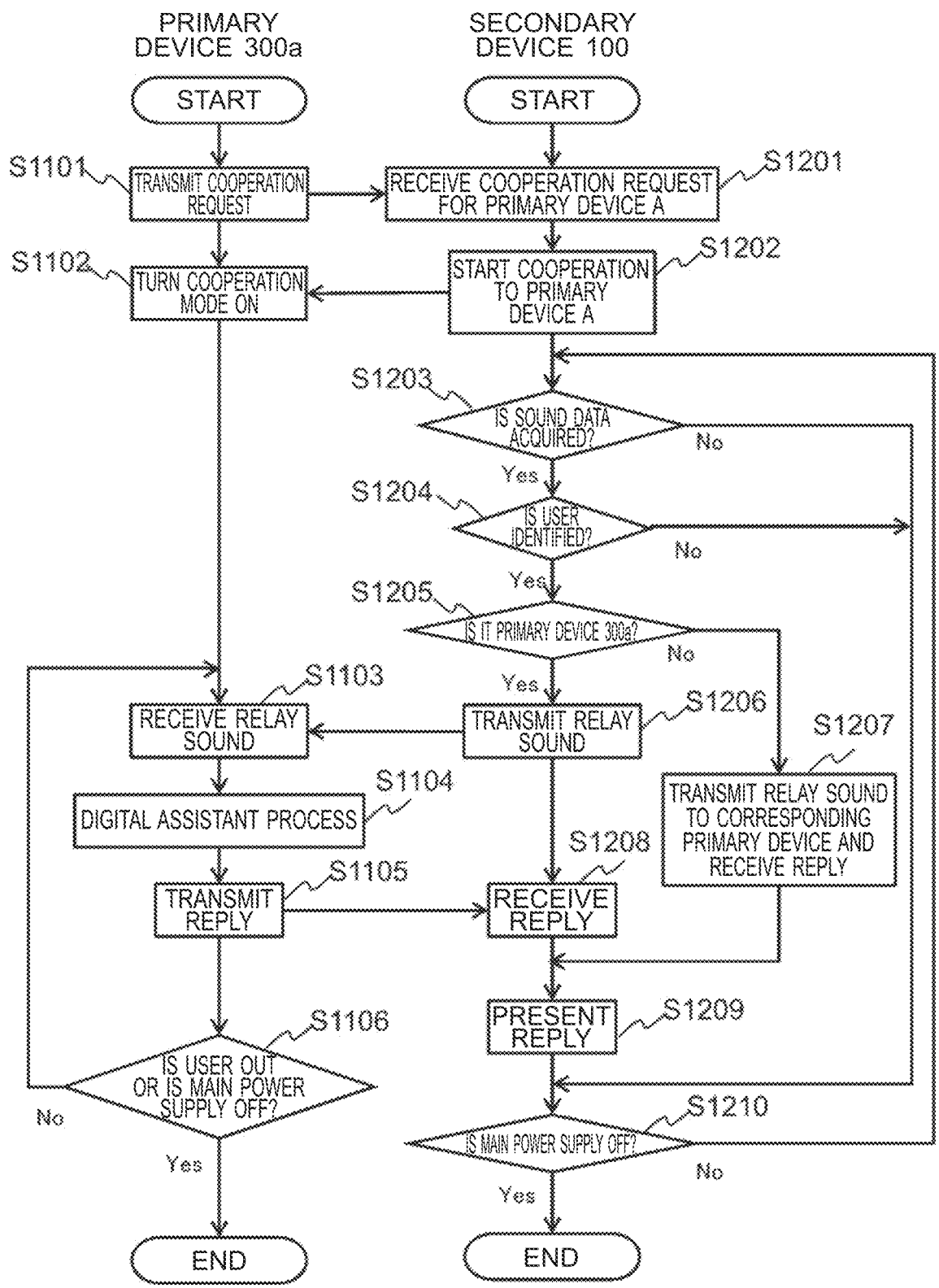
FIG. 8 is a flowchart of a digital assistant cooperation process according to the first embodiment.

A flow of the digital assistant cooperation process according to the present embodiment will be described. FIG. 8 is a process flow of the digital assistant cooperation process according to the present embodiment. Here, the case will be described as an example in which cooperation is performed between the primary device 300a in the primary device 300 and the secondary device 100. It should be noted that here, it is assumed that the registration of the cooperation information DB 230 and the secondary device management DB 430 is completed with the initial setting unit 424 and the cooperation setting unit 211.

First, upon recognizing the AP 510, the cooperation management unit 423 of the primary device 300a transmits a cooperation request command (Step S1101). Here, the cooperation management unit 423 transmits the cooperation request command toward the AP 510. In the case where the number of the secondary device 100 registered in the secondary device management DB 430 is one, the cooperation management unit 423 may identify the secondary device 100 and transmit a cooperation request command.

Upon receiving the cooperation request command from the primary device 300a (Step S1201), the secondary device 100 starts cooperation with the primary device 300 of a transmission source (Step S1202). Here, the cooperation setting unit 211 makes reference to the cooperation information DB 230, and sets the cooperation flag 234 of the data of the primary device 300a. The cooperation setting unit 211 returns the cooperation establishment command to the primary device 300 of a transmission source.

The cooperation management unit 423 of the primary device 300a receives the cooperation establishment command to turn the cooperation mode with the secondary device 100 to ON (Step S1102). Here, the cooperation management unit 423 sets the cooperation flag 433 of the data of the corresponding secondary device 100 in the secondary device management DB 430.

By the processes described above, digital assistant cooperation is established between the primary device 300a and the secondary device 100.

After establishing digital assistant cooperation, the secondary device 100 discriminates whether or not the sound data is acquired by the sound acquiring unit 212 at a predetermined time interval (Step S1203).

In the case where no sound data is acquired (S1203; No), the secondary device side cooperation unit 210 discriminates whether the main power supply of the secondary device 100 is turned OFF (Step S1210), and in the case where it is discriminated that the main power supply is turned OFF, the process is ended. In the case where the main power supply is not turned OFF, the process returns to Step S1203, and the process is continued.

On the other hand, in the case where sound data is acquired, the destination device determination unit 213 discriminates whether the user can be identified from the sound data (Step S1204). Here, as described above, the destination device determination unit 213 collates the sound data with the pieces of voice information 242 stored in the user information DB 240, and discriminates whether or not there is a record that can be determined as a match.

In the case where it is discriminated that the user fails to be identified (S1204; No), i.e., in the case where there is no record that can be determined as a match in the voice information 242, the process goes to Step S1210.

On the other hand, in the case where there is a record that can be determined as a match (S1204; Yes), the destination device determination unit 213 identifies a person uttering the sound data, and identifies the associated primary device 300 (Step S1205). Here, the destination device determination unit 213 extracts the user ID 241 registered in association with the voice information 242 that can be determined as a match. The destination device determination unit 213 then makes reference to the cooperation information DB 230, extracts the corresponding primary device ID 232 and the access information 233, and notifies the sound acquiring unit 212.

For example, in the case where the primary device 300 identified with the primary device ID 232 is the primary device 300a which is the primary device 300 of user A, the sound acquiring unit 212 instructs the transmitting and receiving unit 214 to transmit the sound data as a relay sound toward the primary device 300a. Upon receiving the instruction, the transmitting and receiving unit 214 transmits a relay sound toward the primary device 300a (Step S1206).

It should be noted that in the case where the user who is discriminated by the destination device determination unit 213 is a user other than user A, the transmitting and receiving unit 214 transmits a relay sound to the primary device 300 of the discriminated user, and receives a reply (Step S1207).

On the primary device 300a side, upon receiving the relay sound (Step S1103), the data receiving unit 421 outputs the assistant unit 410.

The assistant unit 410 performs the digital assistant process (Step S1104), and generates a reply. It should be noted that in the case where the assistant unit 410 discriminates that the transmitted relay sound is not a target for the digital assistant process, no process is performed.

The reply transmitting unit 422 returns the obtained reply to the secondary device 100 of a transmission source (Step S1105). After that, in the primary device 300a, the process returns to Step S1103 until the cooperation management unit 423 detects that the cooperation is released (Step S1106), and waits for the reception of the relay sound. On the other hand, upon detecting the release of cooperation, the process is ended. It should be noted that the release of cooperation means the state in which the user is out or the main power supply is turned OFF, for example.

In the secondary device 100, upon receiving a reply from the primary device 300a by the transmitting and receiving unit 214 (Step S1208), the reply presentation unit 215 presents the reply (Step S1209). Here, the reply presentation unit 215 generates video data and voice data from the reply, and outputs the video data and the voice data from the display 140 and the sound output unit 150, respectively.

Figure 9A:
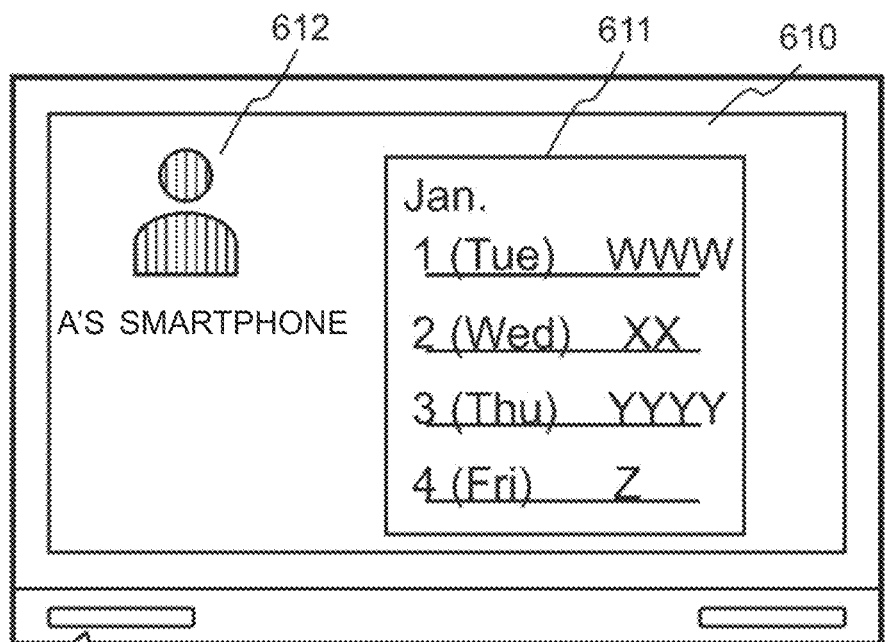
FIGS. 9A and 9B are illustrations for explaining examples of screens according to the first embodiment.

FIG. 9A shows an output example to the display 140 at this time. FIG. 9A shows an example of sound data that is an inquiry about schedule such as "tell me my schedule next week". As shown in the present drawing, an example screen 610 to be displayed includes a reply display region 611 and a primary device information display region 612.

On the reply display region 611, video data obtained as a reply is displayed. In the case of the present example, video data generated from schedule information extracted from the memory 312 by the assistant unit 410 of the primary device 300a is displayed.

On the primary device information display region 612, information that identifies the primary device 300 which is the source of the reply such as a primary device ID is displayed.

It should be noted that also in the case where in Step S1205, it is discriminated that the user is not user A and a reply is received from the primary device 300 of the discriminated user, the reply presentation unit 215 presents this reply.

Figure 9B:
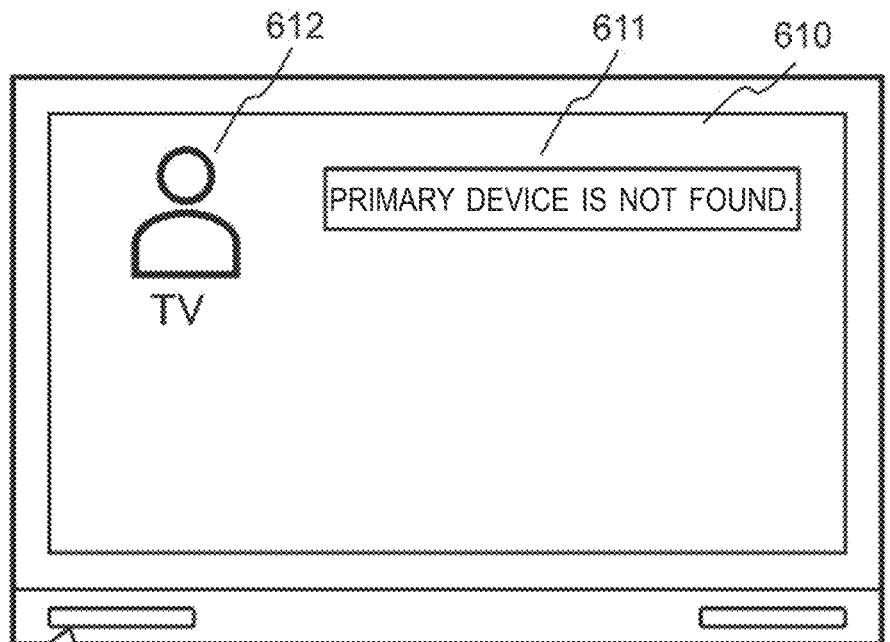

However, in the case where no cooperation is established with the primary device 300 of the discriminated user, the reply presentation unit 215 shows a display meaning that no cooperation is established. For example, as shown in FIG. 9B, a display such as "the primary device is not found" is shown, and similar voice data is outputted. At this time, since the replied device is the secondary device 100, the reply presentation unit 215 shows the secondary device 100 on the primary device information display region 612. It should be noted that the video data and the voice data are stored in the memory 112 and the like in advance.

After that presentation of the reply in Step S1209, the secondary device side cooperation unit 210 goes to Step S1210. It should be noted that after transmitting the relay sound in Step S1206, the secondary device side cooperation unit 210 starts measuring time. In the case where no reply is obtained within a predetermined time period, the secondary device side cooperation unit 210 determines as timeout, and goes to Step S1210 as it is.

As described above, the assistant system 900 according to the present embodiment includes the secondary device 100 that relays sound data to the primary device that executes the digital assistant process, the secondary device including the sound acquiring unit 212 that acquires surrounding sounds as sound data, the destination device determination unit 213 that determines the destination primary device which is the primary device 300 that is the destination of the sound data, the transmitting and receiving unit 214 that transmits the sound data to the destination primary device and receives the result of the digital assistant process executed depending on the sound data as a reply from the destination primary device, and the reply presentation unit 215 that presents the reply received at the transmitting and receiving unit 214.

Since the destination device determination unit 213 is included which determines the primary device 300 that is the relay destination of the sound data, it is possible to relay the sound data toward an appropriate primary device 300 even when there are multiple primary devices 300. Thus, even when there are multiple primary devices 300 having the digital assistant function and they are at locations away from user's hands, it is possible to obtain the result of desired digital assistant.

For example, the destination device determination unit 213 analyzes the sound data to discriminate the user who is an uttering person, and determines the primary device 300 registered in association with the discriminated user as the destination primary device. Therefore, according to the present embodiment, it is possible to provide the individual users with the digital assistant function by the primary devices 300 of the individual users.

Exemplary Modification 1

It should be noted that in the foregoing embodiment, when the primary device 300 itself recognizes the AP 510, the primary device 300 discriminates that digital assistant cooperation is ready. The primary device 300 then transmits a cooperation request command to the secondary device 100, and goes to the cooperation mode. However, the trigger to the cooperation mode is not limited. For example, in the case where it is detected that the primary device 300 is placed on the charging base 511, and then the mode may go to the cooperation mode.

In this case, the cooperation management unit 423 discriminates whether or not the primary device 300 is placed on the charging base 511, instead of discriminating whether the AP 510 is recognized or not. In the case where the primary device 300 is placed on the charging base 511, the cooperation management unit 423 discriminates that digital assistant cooperation is ready, and outputs the cooperation request command toward the AP 510.

It should be noted that the charging base 511 may be provided with a control unit and a communication interface. In this case, when the charging base 511 side detects that the primary device 300 is placed, the cooperation request command is outputted to the secondary device 100 through the AP 510.

At this time, the charging base 511 transmits the primary device ID and the access information of the primary device 300 to be a cooperation target together.

Alternatively, a configuration may be provided in which the access information of the charging base 511 itself is transmitted, and after that, data is transmitted and received between the secondary device 100 and the primary device 300 through the charging base 511.

Exemplary Modification 2

In the foregoing embodiment and the exemplary modification, in the case where the cooperation management unit 423 detects some device, it is discriminated that digital assistant cooperation is ready. However, the discrimination whether or not digital assistant cooperation is ready is not limited.

For example, in the case where the position detecting unit 370 of the primary device 300 discriminates that the primary device 300 is present in a predetermined region, the cooperation management unit 423 may discriminate that digital assistant cooperation is ready.

For example, it is assumed that a predetermined region is a residence and the like. Upon receiving the discriminated result by the position detecting unit 370, the cooperation management unit 423 outputs a cooperation request command to establish cooperation.

Thus, in the case where the user of the primary device 300 returns to the user's residence, control can be performed such that the primary device 300 is in the cooperative state.

Exemplary Modification 3

For example, in the case where the user wears a wearable device to perform proximity communication with the primary device 300, it may be discriminated that digital assistant cooperation is ready with another method.

That is, when it is detected that proximity communication is stopped with the wearable device, the cooperation management unit 423 may discriminate that digital assistant cooperation is ready. The stoppage of the proximity communication between the wearable device and the primary device 300 is due to the separation of the distance between the wearable device and the primary device 300. Therefore, it is possible to discriminate that the user leaves the primary device 300.

Upon receiving an output indicating that communication from the proximity communication interface 361 is stopped, the cooperation management unit 423 outputs a cooperation request command to establish cooperation.

It should be noted that the wearable device is a smart watch 301, an HMD 302, a wireless headphone 303, and the like, for example.

It should be noted that in the case where the primary device 300 is the HMD 302, when the cooperation management unit 423 detects that the user has removed the HMD 302 with the sensor of the HMD 302, it may be discriminated that digital assistant cooperation is ready.

Exemplary Modification 4

It should be noted that in the foregoing embodiment, in the case where a cooperation establishment command is received from the secondary device 100 in the state ready for digital assistant cooperation, the cooperation mode is ON on the primary device 300 side. However, the configuration is not limited. A configuration may be provided in which on the primary device 300 side, the cooperation mode is always ON. That is, at the time point at which the initial setting unit 424 performs initialization, the cooperation flag 433 is turned ON.

In this case, in the above-described cooperation process, processes of Step S1101, S1102, S1201, and S1202 are unnecessary.

However, in this case, in the transmission of a relay sound to the corresponding primary device 300 through the AP 510 in Step S1206, the transmission sometimes fails depending on the location of the primary device 300. In such a case, the transmission failure is outputted to the user.

Exemplary Modification 5

In the foregoing embodiment, the initial setting unit 424 registers information on a device that functions as the secondary device 100 in the secondary device management DB 430 in advance. However, in the case where the cooperation mode is always ON on the primary device 300 side, the secondary device management DB 430 does not necessarily have to be set.

For example, in the reception of the relay sound in Step S1103 in the cooperation process, the primary device side cooperation unit 420 manages the access information of the secondary device 100 of a transmission source. After obtaining a reply, the reply transmitting unit 422 transmits the reply based on the managed access information.

Exemplary Modification 6

In the foregoing embodiment, the destination device determination unit 213 of the secondary device 100 analyzes sound data, and discriminates a user. However, the configuration is not limited. For example, the destination device determination unit 213 may discriminate a user with a face image.

In this case, the secondary device 100 includes the camera 181 that acquires the face image of a user. As shown in FIG. 6B, in the user information DB 240, face images 243 for checking users are registered in advance in association with the user IDs 241.

The destination device determination unit 213 analyzes an image acquired by the camera 181 in synchronization with the acquisition of sound data by the sound acquiring unit 212. The destination device determination unit 213 collates the image with the face image 243, and extracts the user ID 241 in association with the matched face image. The destination device determination unit 213 outputs the primary device ID 232 and the access information 233, in association with the user ID 231 matched with the extracted user ID 241, to the sound acquiring unit 212 as a determined result.

Exemplary Modification 7

In the case where the data receiving unit 421 of each of the primary devices 300 has a function of performing an identity verification process using received sound data, the destination device determination unit 213 of the secondary device 100 does not necessarily have to analyze sound data to determine the primary device of the destination.

At this time, the destination device determination unit 213 outputs the primary devices ID 232 and pieces of access information 233 of all the primary devices 300 to which the cooperation flag 234 is set in the cooperation information DB 230 to the sound acquiring unit 212. Thus, the sound acquiring unit 212 transmits the acquired sound data to all the primary devices 300 to which the cooperation flag 234 is set.

The primary devices 300 perform the identity verification process at the data receiving unit 421 using the received sound data. In the case where the identity is verified, the received sound data is outputted to the assistant unit 410 to request the digital assistant process.

Thus, the corresponding primary device 300 performs the digital assistant process only in the case where the sound data is the voice of the user of the primary device 300, and outputs a reply. Therefore, in this case, it is possible to obtain a desired reply without sorting destinations with sound data on the secondary device 100 side.

Exemplary Modification 8

For example, one user often uses multiple primary devices 300. In such a case, information on the plurality of primary devices 300 may be registered in the cooperation information DB 230 in association with the same user ID 231. For example, in the cooperation information DB 230 in FIG. 6A, 300a-1 and 300a-2 in the primary device ID 232 are primary devices 300 owned by the same user.

In this case, after the user is identified in Step S1204 in the above-described digital assistant cooperation process, the destination device determination unit 213 presents, to the user, information on the primary device 300 extracted from the cooperation information DB 230, and accepts a selection from the user.

In regard to information presented here, in the case where the names (primary device names 236) of the primary devices are registered in the cooperation information DB 230, for example, the names are displayed. In the case where the primary device name 236 is not registered, the primary device ID 232 and the like, for example, is displayed.

FIG. 10A shows an example display of a selection screen 620 displayed when a selection is accepted. For example, the selection screen 620 includes a message display region 621 and a selection accepting region 622.

In the message display region 621, the number of detected primary devices and an operation to be requested to the user are displayed as messages. The selection accepting region 622 is a region that accepts a selection by the user. For example, in the case where the secondary device 100 is a television set, the user selects the primary device 300 through the selection accepting region 622 by the operation and the like using the remote controller of the television set.

The destination device determination unit 213 determines the primary device 300 accepted through the selection accepting region 622 as the primary device 300 of the destination. Then, the transmitting and receiving unit 214 transmits sound data as a relay sound to the primary device 300.

It should be noted that in this case, a selection does not necessarily have to be accepted from the user. The destination device determination unit 213 notifies the transmitting and receiving unit 214 of information on the primary device 300 of the corresponding user extracted from the cooperation information DB 230. Then, the transmitting and receiving unit 214 transmits sound data to all the extracted primary devices 300. The transmitting and receiving unit 214 may receive all the obtained replies to cause the reply presentation unit 215 to present the replies.

For example, in the case where personal information necessary for inquiries is stored in the smartphone and no personal information is stored in a tablet, a desired reply is obtained from the smartphone, and a reply that no reply is feasible or no reply is obtained from the tablet. Therefore, in any case, the user can obtain a desired reply.

It should be noted that at this time, the transmitting and receiving unit 214 may transmit sound data to the extracted primary device 300 in a predetermined order. For example, the predetermined order is an order of registration in the cooperation information DB 230. First of all, the transmitting and receiving unit 214 transmits the sound data to one primary device 300. Then, in the case where no return reply is received within a predetermined period, or in the case where a reply that not reply is feasible is received, the transmitting and receiving unit 214 transmits sound data to the subsequent primary device 300. In the case where a reply is obtained, the transmitting and receiving unit 214 causes the reply presentation unit 215 to present the reply. On the other hand, in the case where no reply is obtained from any primary device 300, the transmitting and receiving unit 214 causes the reply presentation unit 215 to present this.

It should be noted that the priority of transmission of sound data may be set in the cooperation information DB 230. In this case, the transmitting and receiving unit 214 transmits sound data in accordance with the priority.

Exemplary Modification 9

It should be noted that in the foregoing embodiment, the case is described as an example where the secondary device 100 is a television set including the display 140. However, the configuration of the secondary device 100 is not limited. For example, the secondary device 100 may be a smart speaker 101 including no display 140.

In this case, the smart speaker 101 includes a corresponding device registration DB 250. In the corresponding device registration DB 250, a device that is a nearby device including the display 140 is registered as a video output device in advance. FIG. 10B shows an example of the corresponding device registration DB 250 in this case. As shown in the present drawing, in the corresponding device registration DB 250, a secondary device ID 251 that is identification information on the secondary device 100 and a video output destination device ID 252 that is the identification information of the video output device in association with each other are registered. For example, the corresponding device registration DB 250 is registered in the memory 112.

The reply presentation unit 215 analyzes data obtained as a reply. In the case where the data is data that can be outputted with only a sound, the reply presentation unit 215 outputs the data from the sound output unit 150 of the secondary device 100. On the other hand, in the case where the reply includes video data and has to be outputted to the display 140, the reply presentation unit 215 makes reference to the corresponding device registration DB 250, and identifies a device including the associated display 140. Then, the reply presentation unit 215 transfers the video data to the corresponding device so as to output.

At this time, as shown in FIG. 10C, the smart speaker 101 that is the secondary device 100 may output the display destination of the reply by speech.

With this configuration, it is possible to use a variety of devices as the secondary device 100.

It should be noted that for example, in the case where all the secondary devices 100 include a specification database in which the specifications of the nearby devices are registered in advance, the corresponding device registration DB 250 does not necessarily have to be included. In the specification database, for example, the arrangement locations and the like of the secondary devices 100, e.g., whether or not the secondary devices 100 include a display device, are stored. In this case, the reply presentation unit 215 extracts a device that is a nearby device including the display 140 from this database, and transfers video data to the extracted device.

It should be noted that in the case where there are multiple secondary devices 100, the data receiving unit 421 of the primary device 300 receives sound data from each of the secondary devices 100. In such a case, in the data receiving unit 421, the digital assistant process with the sound acquired by the data receiving unit 421 conflicts with the digital assistant process with sound data via the secondary device 100 because the data receiving unit 421 instructs the same process.

In such a case, the data receiving unit 421 establishes a communication path with the secondary device 100, which is a transmission source of the earliest transmission of the sound data.

Second Embodiment

A second embodiment of the present invention will be described. In the first embodiment, the secondary device 100 is a relay device that relays sound data to the primary device 300.

In the present embodiment, a secondary device 100 also has an assistant function.

Figure 11:
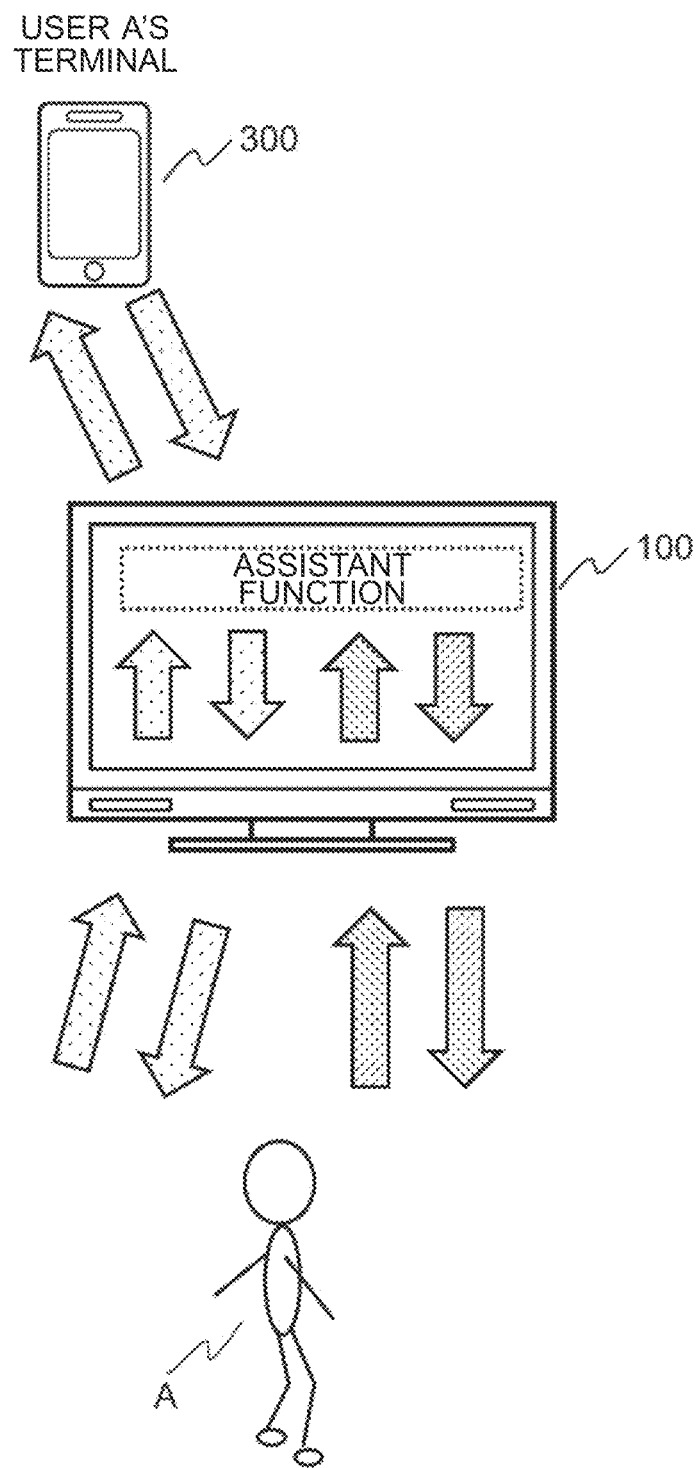
FIG. 11 is an illustration for explaining the outline of a second embodiment.

The outline of a process according to the present embodiment will be described with reference to FIG. 11. Upon receiving sound data, the secondary device 100 according to the present embodiment analyzes the sound data with the assistant function, and discriminates whether or not a request from a user by the sound data needs the personal information of the user for obtaining a reply.

In the case where the request from the user is a request that needs no personal information of the user, the secondary device 100 performs the assistant process, and presents a reply to the user. On the other hand, in the case where the request is a request that needs the personal information of the user, similarly to the first embodiment, the sound data is transferred to a primary device 300, a reply is generated in the primary device 300, and the reply is presented in the secondary device 100.

In the following, the description will be made focused on the configurations of the present embodiment different from the first embodiment. The primary device 300 is similar to the first embodiment. The hardware configuration of the secondary device 100 is the same as the first embodiment. However, a functional block is different from the first embodiment.

Figure 12:
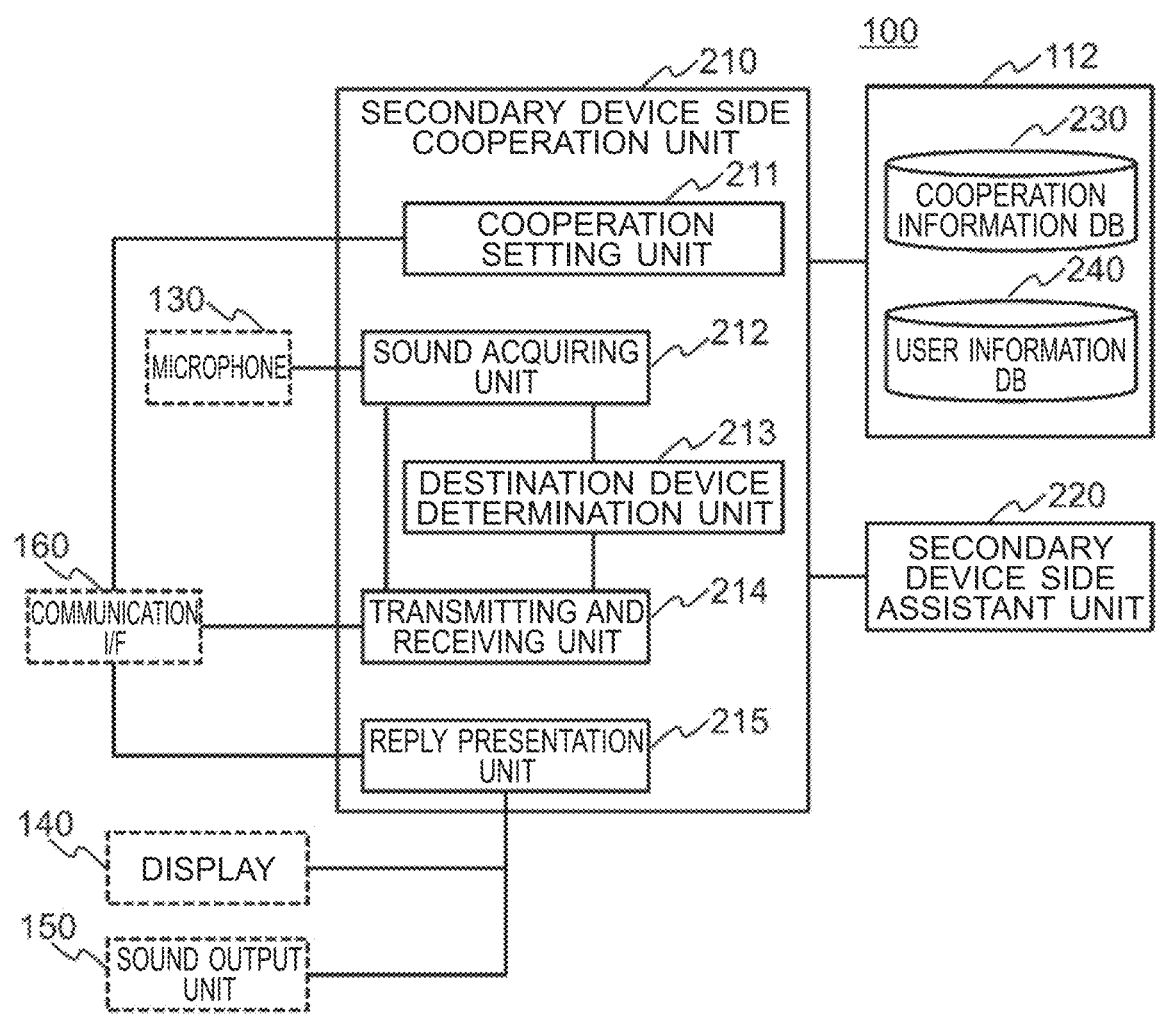
FIG. 12 is a functional block diagram of a secondary device according to the second embodiment.

FIG. 12 is a functional block of the secondary device 100 according to the present embodiment. As shown in the present drawing, similarly to the first embodiment, the secondary device 100 according to the present embodiment includes a secondary device side cooperation unit 210. The secondary device side cooperation unit 210 includes a cooperation setting unit 211, a sound acquiring unit 212, a destination device determination unit 213, a transmitting and receiving unit 214, and a reply presentation unit 215. The secondary device 100 includes a secondary device side assistant unit 220.

Upon generating sound data, the sound acquiring unit 212 according to the present embodiment first transmits the sound data to the secondary device side assistant unit 220.

Similarly to the assistant unit 410 of the primary device 300, the secondary device side assistant unit 220 analyzes the sound data, performs the assistant process, and outputs a reply. However, in the case where the secondary device side assistant unit 220 discriminates that personal information on users is necessary as the analyzed result of the sound data, the secondary device side assistant unit 220 outputs this to the destination device determination unit 213.

In the case where the destination device determination unit 213 according to the present embodiment receives an instruction that personal information is necessary from the secondary device side assistant unit 220, the destination device determination unit 213 discriminates a user as described above, and determines the primary device 300 of the destination.

[Digital Assistant Cooperation Process]

Figure 13:
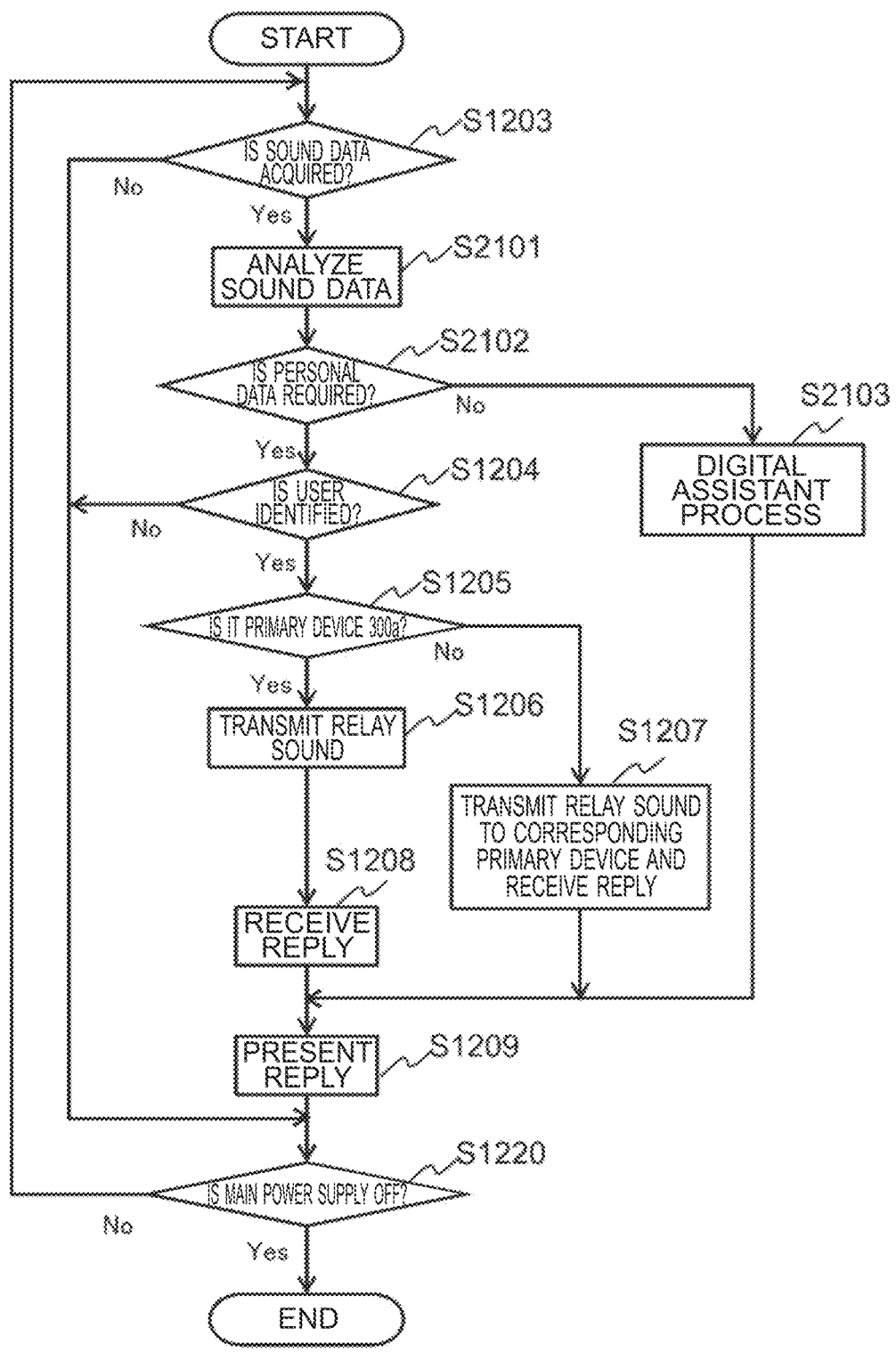
FIG. 13 is a flowchart of a digital assistant cooperation process of the secondary device according to the second embodiment.

Next, a flow of a digital assistant cooperation process of the secondary device 100 according to the present embodiment will be described. FIG. 13 is a process flow of the digital assistant cooperation process of the secondary device 100 according to the present embodiment. Here, the secondary device 100 is in cooperation with at least one primary device 300.

The sound acquiring unit 212 discriminates whether or not sound data is acquired at a predetermined time interval (Step S1203). Upon acquiring sound data (S1203; Yes), the sound acquiring unit 212 transmits the sound data to the secondary device side assistant unit 220.

The secondary device side assistant unit 220 analyzes the sound data (Step S2101), and the secondary device side assistant unit 220 discriminates whether or not personal information is necessary for making a reply (Step S2102).

In the case where the secondary device side assistant unit 220 discriminates that personal information is necessary (S2102; Yes), the secondary device side assistant unit 220 notifies the destination device determination unit 213 about this. The destination device determination unit 213 that has received the notification performs processes after Step S1204 according to the first embodiment.

On the other hand, in the case where the secondary device side assistant unit 220 discriminates that personal information is unnecessary (S2102; No), the secondary device side assistant unit 220 performs the assistant process as it is based on the corresponding sound data (Step S2103), generates a reply, and the process goes to Step S1209. The processes after this are the same as the first embodiment.

Figure 14:
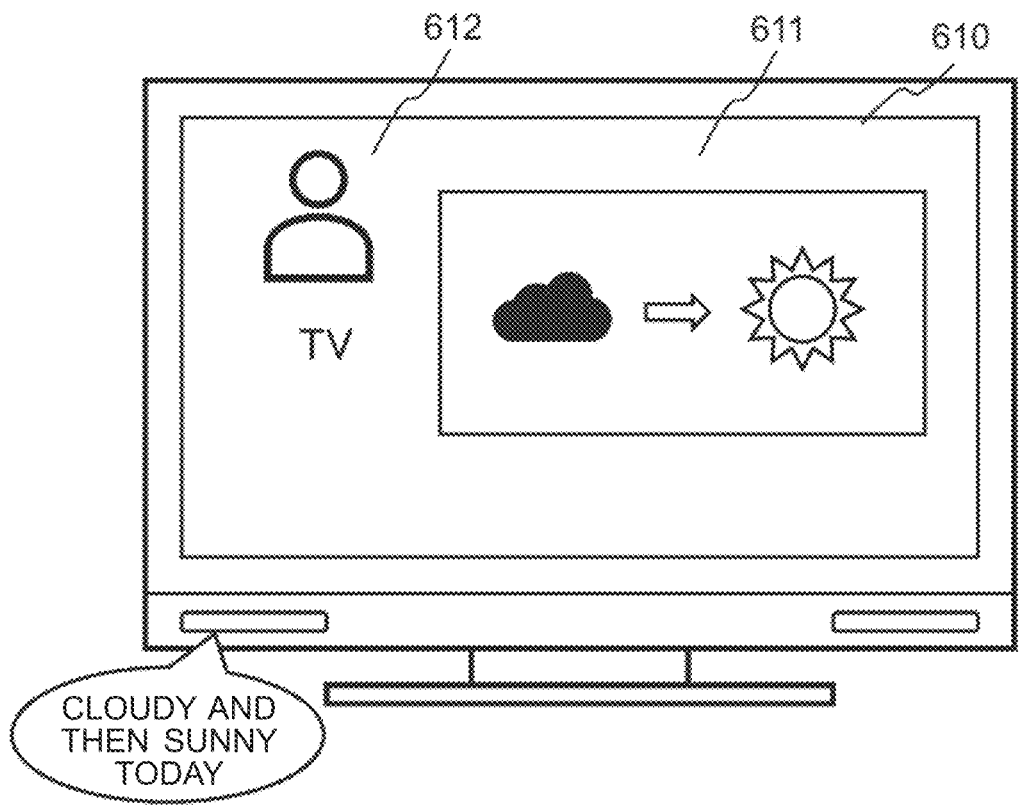
FIG. 14 is an illustration for explaining an example of an output according to the second embodiment output.

In the present embodiment, in the case where the weather at a specific location is asked, for example, personal information is unnecessary. FIG. 14 shows an output example in such a case. In this case, a reply is displayed on the reply display region 611. On the other hand, in the primary device information display region 612, information that identifies the secondary device 100 is displayed as a processed result in the secondary device 100. In this case, since the secondary device 100 is a TV, TV is displayed in the primary device information display region 612, for example.

As described above, the secondary device 100 of an assistant system 900 according to the present embodiment includes the secondary device side assistant unit 220 that executes the digital assistant process in addition to the function of the secondary device 100 according to the first embodiment. The secondary device side assistant unit 220 then analyzes the sound data, and discriminates whether or not personal information is necessary to execute the digital assistant process. In the case where the secondary device side assistant unit 220 discriminates that personal information is necessary, the destination device determination unit 213 determines the destination primary device. In the case where the secondary device side assistant unit 220 executes the digital assistant process, the reply presentation unit 215 further presents the result of the digital assistant process.

Therefore, according to the present embodiment, similarly to the first embodiment, even when the primary device 300 is away, it is possible to present, to the individual users, the result of the digital assistant process by the primary devices 300 of the individual users. According to the present embodiment, in the case of an assistant request that personal information stored in the primary devices 300 of the individual users is unnecessary, the digital assistant process is executed on the secondary device 100 side for a reply. Therefore, it is possible to obtain a quick reply.

Exemplary Modification 10

It should be noted that in the foregoing embodiment, the secondary device side assistant unit 220 discriminates whether or not personal information is necessary for performing the assistant process. However, the configuration is not limited. For example, the secondary device side assistant unit 220 may discriminates whether sound data is a voice command or not.

In the case where sound data is discriminated as a voice command, similarly to the first embodiment, the secondary device side assistant unit 220 causes the destination device determination unit 213 to discriminate a user, regardless of the content of the assistant request from the user, and to determine the primary device 300 of the destination. The transmitting and receiving unit 214 then transmits the sound data to the determined primary device 300.

It should be noted that in this case, a configuration may be provided in which after analyzing the sound data, the secondary device side assistant unit 220 generates a command for the digital assistant process and the generated command is transmitted from the transmitting and receiving unit 214 to the primary device 300.

It should be noted that whether or not to need the discrimination of personal information may be further combined. That is, in the case where it is discriminated that the personal information is necessary, the secondary device side assistant unit 220 causes the destination device determination unit 213 to discriminate whether the user who is an uttering person of the sound using the sound data, and to determine the primary device 300 of the destination. The transmitting and receiving unit 214 then transmits a command toward the determined primary device 300, not sound data.

In the case where a command is transmitted to the primary device 300, the assistant unit 410 on the primary device 300 side is not necessary to analyze the sound data.

Exemplary Modification 11

In the case where the secondary device 100 includes the secondary device side assistant unit 220 that analyzes sound data, a configuration may be provided in which sound data is transmitted to a primary device identified with invocation by the user.

For example, in the case where sounds such as "ask AAS", "OK, BBB", and the like are uttered, the secondary device side assistant unit 220 analyzes the sound data of the sounds, and identifies the destination of the sound data. That is, in the case where the sound data includes a sound corresponding to the primary device name 236, for example, the secondary device side assistant unit 220 notifies the destination device determination unit 213 about this.

The destination device determination unit 213 determines the primary device 300 having including data of the primary device name 236 notified from the secondary device side assistant unit 220 as the primary device 300 of the destination.

In this case, the names of the primary devices 300 are registered in the cooperation information DB 230 in advance as the primary device name 236.

With this configuration, it is possible to determine more accurately the primary device 300 of the destination. Thus, it is possible to obtain a reply more appropriately responding to the assistant request from the user.

Exemplary Modification 12

In the above-described embodiment and the exemplary modifications, a communication path is established between the primary device 300 and the secondary device 100 for transmission and reception of a pair of an inquiry and a reply. However, a communication path may be established until an instruction of explicit cancellation of the communication path from the user is received or a lapse of a predetermined time period.

Thus, a process of discriminating a user every time when sound data is acquired is unnecessary. For example, in the case where multiple times of exchange are necessary for receiving digital assistant, for example, it is possible to smoothly advance the process. Specifically, it is the case where a user confirms his/her schedule and registers a new schedule, for example.

In this case, the user first inquires a schedule in a certain period. At this time, the secondary device 100 analyzes sound data, discriminates the user, and determines the primary device 300 of the destination. The secondary device 100 then transmits the corresponding sound data or a command to the corresponding primary device 300.

The primary device 300 returns a reply to the secondary device 100 of a transmission source, correspondingly. The secondary device 100 presents the reply to the user. The user sees the reply, and utters a new voice command. For example, a new schedule is added to a certain date, a schedule on a certain date is changed, and the like.

At this time, upon acquiring this sound data, the secondary device 100 transmits the sound data to the primary device 300 to which the communication path is established, without performing discrimination of the user and the determination process of the destination primary device. On the primary device 300 side, the sound data is analyzed to perform the process.

Exemplary Modification 13

It should be noted that the above-described assistant system 900 may include a portable information processing device such as a smartphone and a wearable device. In this case, the wearable device is used as the secondary device 100, and the portable information processing device is used as the primary device 300.

Figure 15:
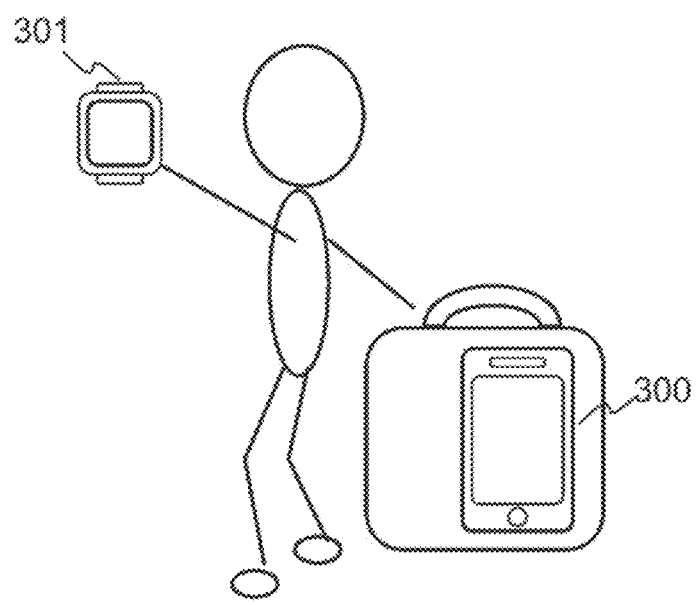
FIG. 15 is an illustration for explaining the outline according to an exemplary modification of the embodiment of the present invention.

For example, as shown in FIG. 15, the user puts the primary device 300a that is a portable information processing device in a bag and the like, wears a wearable device (the smart watch 301) that functions as the secondary device 100, and goes out. During this outing, the user utters a voice command to the smart watch 301.

The smart watch 301 transmits the acquired voice command of the user to the portable information processing device that is the primary device 300 to execute the assistant process. The result is received on the smart watch 301.

In this case, upon entering an environment including his/her home and the like, for example, where the transmit AP 510 is present, the connection of the smart watch 301 to the portable information processing device is switched to the connection of a home LAN through the AP 510. After that, the smart watch 301 becomes one device in a group of the secondary devices 100 at home.

Exemplary Modification 14

In the foregoing embodiments, the case is described as an example in which a sound by one user is accepted and an assistant result by the primary device 300 or the secondary device 100 of the user is outputted. However, as described above, the number of the primary devices 300 is not limited. Therefore, multiple users sometimes request the digital assistant function at short time intervals.

In such a case, the timing at which a reply is obtained is almost the same, and the reply presentation unit 215 outputs replies that are processed results received from the primary devices 300 to the users through the display 140 or the sound output unit 150. At this time, the reply presentation unit 215 splits the display region of the display 140 corresponding to the number of received processed results (replies), and displays the replies.

Figure 16A:
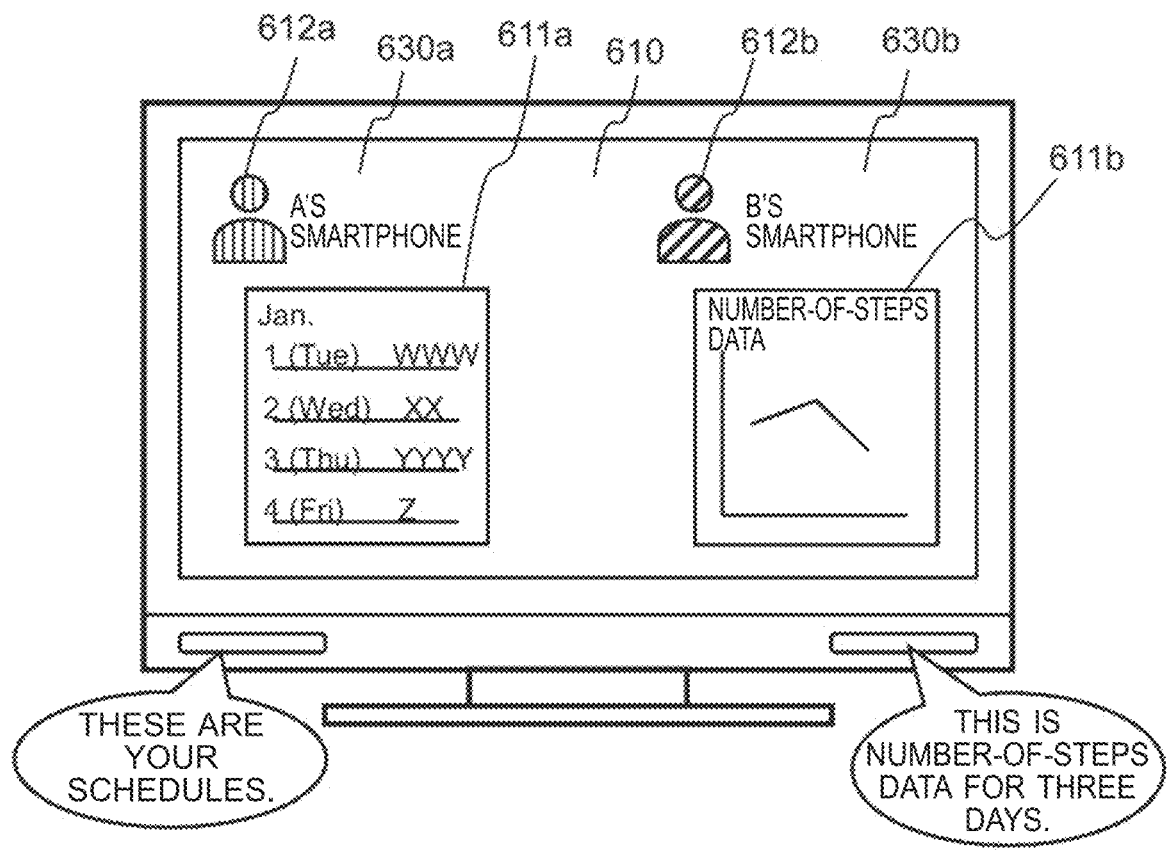
FIG. 16A is an illustration for explaining an example of a screen according to the exemplary modification of the embodiment of the present invention, and 16B is an illustration for explaining the outline of processes according to the same exemplary modification.

FIG. 16A shows a display example of replies in the case where two users, user A and user B, desire to use the assistant function almost simultaneously. The reply presentation unit 215 splits the display region into two regions, and displays a reply together with information that identifies the primary device 300, which is the source of the reply.

The reply presentation unit 215 splits the display region of the display 140, for example, into a first display region 630a on which a reply to user A is displayed and a second display region 630b on which a reply to user B is displayed. Similarly to the above-described embodiment, the primary device information display region 612 (612a and 612b) and the reply display region 611 (611a and 611b) are provided in each of the display regions (630a and 630b). In each of the display regions, information that identifies the primary device 300 which is the source of the reply and the reply are displayed.

It should be noted that an existing multi-viewer is externally attached to the secondary device 100, and replies from multiple primary devices 300 may be displayed on one display 140 using this multi-viewer.

In the case where the speaker 351 has multiple channels, the reply presentation unit 215 may allocate replies of different transmission source to each channel and outputs the replies. At this time, in the case where there are sources having the number equal to or more than the number of channels, the sources may be outputted at time differences.

It should be noted that in the case where inquiries (requests for digital assistant) by multiple users occur almost the same timing, the voices of the users sometimes temporally overlap. In this case, the secondary device 100 according to the present embodiment separates the voices, and relays the corresponding voices or voice commands to the primary devices 300.

Figure 16B:
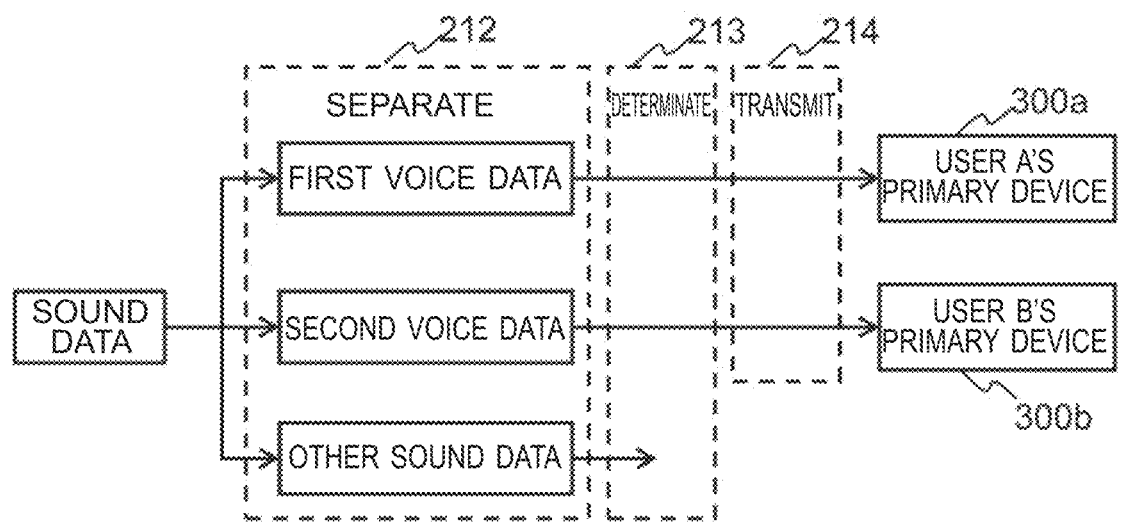

A process performed by the secondary device 100 according to the present embodiment in this case will be described with reference to FIG. 16B.

In this case, the sound acquiring unit 212 of the secondary device side cooperation unit 210 includes a voice separation function that separates sound data for each sound source.

The sound acquiring unit 212 first separates sound data in which voices of a number of people are possibly mixed into for each sound source. In the present exemplary modification, the sound acquiring unit 212 separates the sound data into the voice data of individual persons and/or sound data other than voices, for example. The sound acquiring unit 212 transmits the sound data separated for each sound source to the destination device determination unit 213.

For separation of the sound data, deep learning or clustering processing, for example, may be used. That is, the sound acquiring unit 212 sorts sound components from characteristics by deep learning. The sound components sorted by clustering processing are grouped into the voice data of the individual persons and/or sound data other than voices.

The destination device determination unit 213 separately and independently analyzes the sound data, which is received from the sound acquiring unit 212 and separated for each sound source, and determines the destination device on the voice data in the sound data. Since the determination method is similar to the foregoing embodiments, no description is made here. Similarly to the foregoing embodiments, the destination device determination unit 213 notifies the sound acquiring unit 212 about the primary device ID 232 and the access information 233 for each voice data piece.

The sound acquiring unit 212 instructs the transmitting and receiving unit 214 to transmit the voice data separated for each sound source to the primary device 300 determined by the destination device determination unit 213.

A flow of processes up to transmitting the acquired voice data to the primary devices 300 is basically similar to the foregoing embodiments.

However, in the case where the secondary device 100 includes no assistant function as in the first embodiment, the processes in Step S1203 and Step S1204 of the digital assistant cooperation process in FIG. 8 are changed as below.

That is, in the case where sound data is acquired in Step S1203 in the secondary device 100, the sound acquiring unit 212 separates the sound data for each sound source by the method described above. The destination device determination unit 213 then discriminates whether the user can be identified on the pieces of separated sound data in S1204.

In the case where the secondary device 100 includes the assistant function like the second embodiment, the processes from S1203 to S1204 of the digital assistant cooperation process in FIG. 13 change as below.

That is, in the secondary device 100, in the case where sound data is acquired in Step S1203, the sound acquiring unit 212 separates sound data for each sound source by the method described above. The secondary device side assistant unit 220 then analyzes each piece of separated sound data, and discriminates whether or not personal information is necessary for making a reply. In the case where it is discriminated that personal information is necessary, the secondary device side assistant unit 220 notifies the destination device determination unit 213 of the separated sound data. The process of the destination device determination unit 213 after receiving a notice is similar.

On the other hand, in regard to the separated sound data for which personal information is unnecessary, the secondary device side assistant unit 220 generates a reply as it is based on the sound data, and causes the reply presentation unit to present the reply.

With the present function, even when multiple users simultaneously make requests for the digital assistant function on each primary device 300 at a distant location, it is possible to provide the digital assistant function for the individual users by the primary devices 300 of the individual users.

Exemplary Modification 15

In the foregoing embodiments and the exemplary modifications, a part of the functions of the secondary device 100 and/or the primary device 300 may be implemented at the server 530.

Figure 17:
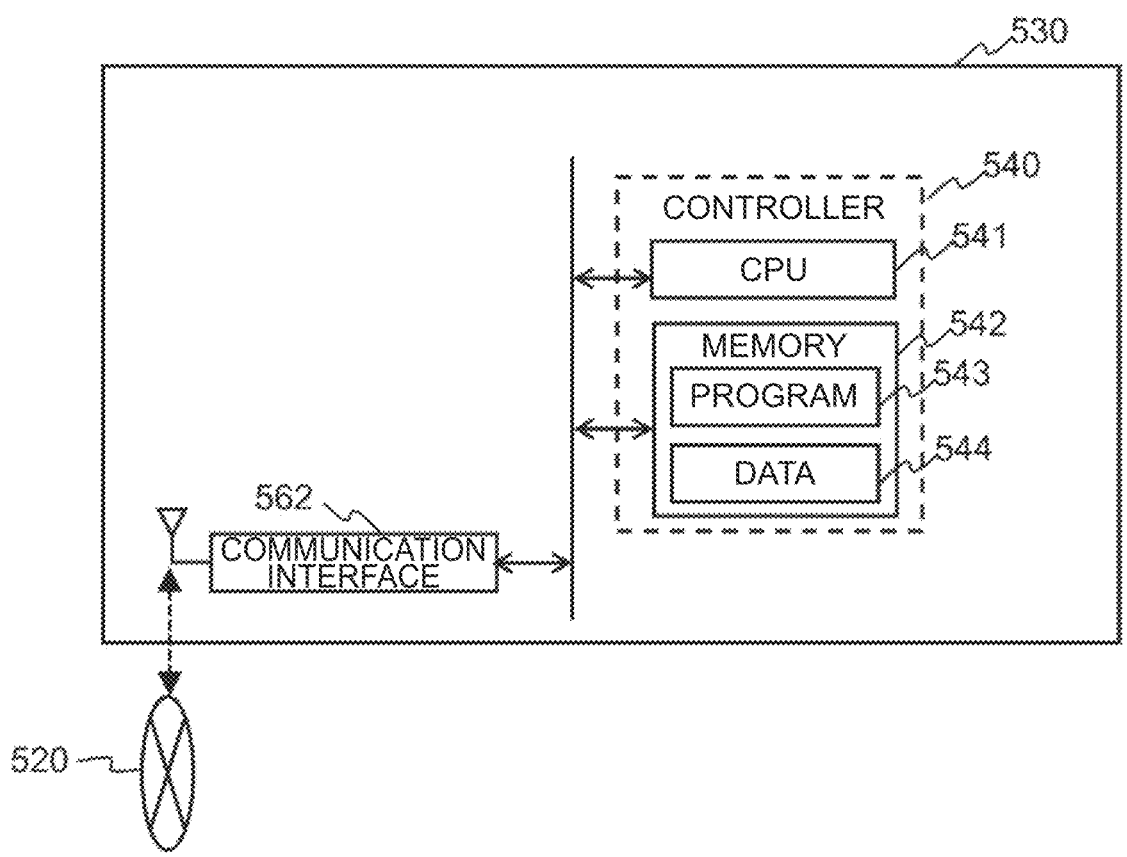
FIG. 17 is a diagram of the hardware configuration of a server according to the exemplary modification of the embodiment of the present invention.

As shown in FIG. 17, the server 530 includes a controller 540 and a communication interface 562. The controller 540 includes a CPU 541 and a memory 542, and the memory 542 stores a program 543 and data 544.

The functions implemented at the server 530 are held as the program 543 in advance in the memory 542. At the server 530, the CPU 541 loads the program 543 stored in the memory 542 in advance in a work area provided in the memory 542, executes the program 543 using the data 544, and thus the functions are implemented.

The present invention is not limited to the foregoing embodiments and the exemplary modifications, and includes various exemplary modifications. For example, the foregoing embodiments and the exemplary modifications are described in detail for easy understanding of the present invention, and are not necessarily limited to ones including all the configurations. A part of the configuration of an embodiment or an exemplary modification may be replaced with the configuration of another embodiment or exemplary modification. To the configuration of an embodiment or an exemplary modification, the configuration of another embodiment or exemplary modification may be added. In regard to a part of the configuration of the embodiments or the exemplary modifications, another configuration may be added, removed, and replaced.

Some or all of the above-described configurations, functions, processing unit, processing units, and the like may be implemented with hardware by designs using integrated circuits, for example. The above-described configurations, the functions, and the like may be implemented with software by the processor interpreting and executing the programs implementing the functions. Information on the programs implementing the functions, tables, files, and the like can be placed on a memory unit, a recording device such as a hard disk or SSD (Solid State Drive), or a recording medium such as an IC card, SD card, or DVD.

Control lines and information lines, which are thought to be necessary for description, are shown, and all control lines and information lines of a product are not necessarily shown. It may be considered that actually, almost all of the configurations are mutually interconnected.

LIST OF REFERENCE SIGNS

100 Secondary device
101 Smart speaker
110 Controller
111 CPU
112 Memory
113 Program
114 Data
120 TV unit
121 Reception tuning unit
122 Signal separation unit
123 Video processing unit
124 Voice processing unit
125 Digital I/F unit
126 User I/F unit
130 Microphone
140 Display
150 Sound output unit
151 Speaker
152 Earphone
160 Communicating unit
161 Proximity communication interface
162 Communication interface
170 Position detecting unit
171 Acceleration sensor
172 Gyro sensor
173 Geomagnetic sensor
174 GPS receiver
181 Camera
182 Range sensor
210 Secondary device side cooperation unit
211 Cooperation setting unit
212 Sound acquiring unit
213 Destination device determination unit
214 Transmitting and receiving unit
215 Reply presentation unit
220 Secondary device side assistant unit
230 Cooperation information database
231 User ID
232 Primary device ID
233 Access information
234 Cooperation flag
235 Primary device type
236 Primary device name
240 User information database
241 User ID
242 Voice information
243 Face image
250 Corresponding device registration database
251 Secondary device ID
252 Video output destination device ID
300 Primary device
300a Primary device (portable information processing device)
300b Primary device (portable information processing device)
300c Primary device (portable information processing device)
301 Smart watch
302 HMD
303 Wireless headphone
310 Controller
311 CPU
312 Memory
313 Program
314 Data
330 Microphone
340 Display
350 Sound output unit
360 Communicating unit 361 Proximity communication interface
362 Communication interface
370 Position detecting unit
371 Acceleration sensor
372 Gyro sensor
373 Geomagnetic sensor
374 GPS receiver
381 Camera
382 Range sensor
410 Assistant unit
420 Primary device side cooperation unit
421 Data receiving unit
422 Reply transmitting unit
423 Cooperation management unit
424 Initial setting unit
430 Secondary device management database
431 Secondary device ID
432 Access information
433 Cooperation flag
510 Access point
511 Charging base
520 External network
530 Server
540 Controller
541 CPU
542 Memory
543 Program
544 Data
562 Communication interface
610 Example screen
611 Reply display region
611a Reply display region
611b Reply display region
612 Primary device information display region
612a Primary device information display region
612b Primary device information display region
620 Selection screen
621 Message display region
622 Selection accepting region
630a First display region
630b Second display region
900 Assistant system

The invention claimed is:

1. An information processing device that relays acquired sound data to a primary device of a plurality of registered primary devices configured to execute a digital assistant process, the information processing device comprising:
a control circuit;
a camera that captures an environment surrounding the information processing device and that outputs picture data;
a microphone that acquires surrounding sound and outputting sound data; and
at least one of a communication interface and a proximity communication interface, wherein
the control circuit is configured to:
analyze the sound data to determine whether or not personal information is necessary to execute the digital assistant process, wherein
only on condition that the personal information is unnecessary, execute the digital assistant process and present a result of the digital assistant process, and
on condition that the personal information is necessary, analyze the sound data and the picture data to identify a speaker,
on condition the speaker is identified and cooperation of the primary device is established, determine a primary device registered in association with the speaker as a destination primary device,
transmit the sound data to the destination primary device and receive a result of a digital assistant process executed by the destination primary device based on the sound data as a reply via the communication interface or the proximity communication interface, and
present the reply as received from the destination primary device without executing the digital assistant process,
wherein cooperation of the primary device is on condition that the primary device stops directly communicating with a device that is other than the information processing device.

2. The information processing device according to claim 1, wherein
the control circuit is configured to
separate the sound data for each sound source;
determine the destination primary device on each piece of the separated sound data;
transmit the separated sound data to the determined destination primary device respectively and receive the reply from each of the destination primary devices; and
output the reply received from each of the destination primary devices.

3. The information processing device according to claim 1,
wherein when a plurality of the primary devices is registered in association with the speaker, the control circuit is configured to accept, from the speaker, a selection of a primary device that is the destination primary device among the plurality of primary devices associated with the speaker.

4. The information processing device according to claim 1,
wherein the control circuit is further configured to output information that identifies the destination primary device.

5. The information processing device according to claim 1, further comprising an assistant circuit configured to execute the digital assistant process,
wherein the assistant circuit is configured to analyze the sound data to extract information that identifies the primary device from the sound data; and
the control circuit is configured to determine, as the destination primary device, the primary device identified by information extracted by the assistant circuit.

6. The information processing device according to claim 1,
wherein the information processing device is a video display device including a speaker and a display.

7. The information processing device according to claim 6, wherein when a plurality of the primary devices is registered in association with the speaker, the control circuit is configured to
display, on the display, the plurality of primary devices registered with the speaker; and
accept, from the speaker, a selection of a primary device that is the destination primary device among the plurality of primary devices associated with the speaker.

8. The information processing device according to claim 7, wherein the display includes a primary device information display region that displays identification information of the destination primary device and a reply display region that displays the result of the digital assistant process or the reply as received from the destination primary device.

9. The information processing device according to claim 8, wherein, in response to a current speaker being identified who is not associated with the destination primary device, the control circuit is configured to
determine a current primary device registered in association with the current speaker as a destination primary device; and
output information for the current primary device to the reply display region of the display.

10. The information processing device according to claim 8, wherein, in response to no primary device being associated with the identified speaker, the control circuit is configured to
output information that no primary display device is associated with the speaker to the reply display region.

11. The information processing device according to claim 1,
wherein the information processing device is a smart speaker; and
when the reply includes video data, the control circuit is configured to transfer the video data to a device including a display associated in advance to cause the device to display the video data.

12. The information processing device according to claim 1, wherein the device that is other than the information processing device is a wearable device.

13. An information processing device that relays acquired sound data to a primary device of a plurality of registered primary devices configured to execute a digital assistant process, the information processing device comprising:
a camera capturing an environment surrounding the information processing device and outputting picture data;
a control circuit;
a microphone acquiring surrounding sound and outputting sound data; and
at least one of a communication interface and a proximity communication interface, wherein
the control circuit is configured to:
analyze the sound data to determine whether or not personal information is necessary to execute the digital assistant process, wherein
only on condition that the personal information is unnecessary, execute the digital assistant process and present a result of the digital assistant process, and
on condition that the personal information is necessary, analyze the sound data and the picture data to identify a speaker,
on condition the speaker is identified and cooperation of the primary device is established, determine a primary device registered in association with the speaker as a destination primary device,
transmit a command to the destination primary device to execute a digital assistant process and receive a result of the digital assistant process as a reply from the destination primary device via the communication interface or the proximity communication interface, and
present the reply as received from the destination primary device without executing the digital assistant process,
wherein cooperation of the primary device is on condition that the primary device stops directly communicating with a device that is other than the information processing device.

14. The information processing device according to claim 13, the device that is other than the information processing device is a wearable device.

15. A digital assistant system that includes a secondary device and a primary device of a plurality of registered primary devices and provides a result of a digital assistant process executed, through the secondary device,
wherein the secondary device includes:
a control circuit;
a camera that captures a surrounding environment and outputting picture data;
a microphone that acquires surrounding sound and outputting sound data; and
at least one of a communication interface and a proximity communication interface,
wherein
the control circuit is configured to:
analyze the sound data to determine whether or not personal information is necessary to execute the digital assistant process, wherein
only on condition that the personal information is unnecessary, execute the digital assistant process and present a result of the digital assistant process, and
on condition that the personal information is necessary, analyze the sound data and the picture data to identify a speaker,
on condition the speaker is identified and cooperation of the primary device is established, determine a primary device registered in association with the speaker as a destination primary device determine the destination primary device from among primary devices to which cooperation of the digital assistant process is established,
transmit the sound data to the destination primary device and receive a result of a digital assistant process executed by the destination primary device based on the sound data as a reply from the destination primary device via the communication interface or the proximity communication interface, and
present the reply as received from the destination primary device without executing the digital assistant process; and
each primary device includes:
a cooperation management circuit configured to establish cooperation of the secondary device on condition that the primary device stops directly communicating with a device that is other than secondary device;
a data receiving circuit configured to receive the sound data from the secondary device via the communication interface or the proximity communication interface;
an assistant circuit configured to execute the digital assistant process depending on the sound data received and output a processed result as the reply; and
a reply circuit configured to transmit the reply output from the assistant circuit to the secondary device which is a source of the sound data.

16. The digital assistant system according to claim 15,
wherein the cooperation management circuit configured to establish cooperation of the digital assistant process further on condition that a connection of the primary device to a predetermined access point is recognized; and
the predetermined access point is an access point to which the secondary device is connected.

17. The digital assistant system according to claim 15, wherein the cooperation management circuit configured to establish cooperation of the digital assistant process further on condition that the primary device detects that the primary device is connected to a predetermined charging base.

18. The digital assistant system according to claim 15, wherein the cooperation management circuit configured to establish cooperation of the digital assistant process further on condition that the cooperation management circuit detects that a present location of the primary device is a predetermined region.

19. The digital assistant system according to claim 15, wherein the device that is other than the secondary device is a wearable device.

20. The digital assistant system according to claim 15, further comprising a display that includes a primary device information display region that displays identification information of the destination primary device and a reply display region that displays the result of the digital assistant process or the reply as received from the destination primary device, wherein in response to a current speaker being identified who is not associated with the destination primary device, the control circuit is configured to
- determine a current primary device registered in association with the current speaker as a destination primary device; and
- output information for the current primary device to the primary device information display region of the display.

* * * * *